(12) United States Patent
Kobayashi et al.

(10) Patent No.: US 9,494,171 B2
(45) Date of Patent: Nov. 15, 2016

(54) MULTIPLE VALVE DEVICE

(71) Applicant: HITACHI CONSTRUCTION MACHINERY, Tokyo (JP)

(72) Inventors: Yoshinobu Kobayashi, Kasumigaura (JP); Mitsuhisa Tougasaki, Ibaraki (JP);
(Continued)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 81 days.

(21) Appl. No.: 14/399,784

(22) PCT Filed: May 22, 2013

(86) PCT No.: PCT/JP2013/064205
§ 371 (c)(1),
(2) Date: Nov. 7, 2014

(87) PCT Pub. No.: WO2013/179968
PCT Pub. Date: May 12, 2013

(65) Prior Publication Data
US 2015/0107712 A1    Apr. 23, 2015

(30) Foreign Application Priority Data
May 31, 2012    (JP) .................................. 2012-125124

(51) Int. Cl.
*F15B 13/06*    (2006.01)
*F15B 13/08*    (2006.01)
(Continued)

(52) U.S. Cl.
CPC ......... *F15B 13/0842* (2013.01); *F15B 13/024* (2013.01); *F15B 13/0817* (2013.01);
(Continued)

(58) Field of Classification Search
CPC ............ Y10T 137/87885; E02F 9/2267; E02F 9/2282; E02F 9/2285; E02F 9/2292;
(Continued)

(56) References Cited

U.S. PATENT DOCUMENTS

| | | | | |
|---|---|---|---|---|
| 3,646,959 A | * | 3/1972 | Connett | ................. E02F 9/2267 137/596.12 |
| 4,030,623 A | * | 6/1977 | Bridwell | ................ E02F 9/2239 414/694 |

(Continued)

FOREIGN PATENT DOCUMENTS

| | | |
|---|---|---|
| JP | 04073404 A | 3/1992 |
| JP | 2000-205426 A | 7/2000 |

(Continued)

*Primary Examiner* — John Fox
*Assistant Examiner* — Seth W Mackay-Smith
(74) *Attorney, Agent, or Firm* — Mattingly & Malur, PC

(57) ABSTRACT

A valve housing of a multiple valve device is formed by being split into two parts, that is, a first housing block and a second housing block abutting against and separated away from each other at positions of facing joining surfaces. Three or more spool sliding bores are provided on the first housing block forming a three-dimensional structure. The other spool sliding bores are provided on the second housing block forming a three-dimensional structure. A relief valve for suppressing maximum pressures in a plurality of oil passages to a predetermined set pressure or less is provided on one of the first and second housing blocks. This relief valve is arranged at a position closer to the joining surfaces than each of the spool sliding bores provided in the one of housing blocks.

4 Claims, 14 Drawing Sheets

(72) Inventors: Satoru Kubota, Tsukuba (JP); Hiroshi Matsuzaki, Tsukuba (JP)

(51) Int. Cl.
*F16K 27/04* (2006.01)
*F16K 27/00* (2006.01)
*F15B 13/02* (2006.01)
*E02F 9/22* (2006.01)

(52) U.S. Cl.
CPC ......... *F15B 13/0896* (2013.01); *F16K 27/003* (2013.01); *F16K 27/041* (2013.01); *E02F 9/2267* (2013.01); *E02F 9/2282* (2013.01); *E02F 9/2285* (2013.01); *E02F 9/2292* (2013.01); *F15B 2211/20576* (2013.01); *F15B 2211/3116* (2013.01); *F15B 2211/50518* (2013.01); *Y10T 137/87885* (2015.04)

(58) Field of Classification Search
CPC ............... F15B 13/024; F15B 13/0817; F15B 13/0821; F15B 13/0842; F15B 13/0896; F15B 2211/20576; F15B 2211/3059; F16K 27/003; F16K 27/041
See application file for complete search history.

(56) References Cited

U.S. PATENT DOCUMENTS

| 5,277,027 | A | * | 1/1994 | Aoyagi | E02F 9/2232 60/420 |
|---|---|---|---|---|---|
| 5,673,558 | A | * | 10/1997 | Sugiyama | E02F 9/2228 60/426 |
| 6,453,585 | B1 | * | 9/2002 | Takahashi | E02F 9/2239 37/348 |
| 8,521,374 | B2 | * | 8/2013 | Karasawa | E02F 9/2253 701/50 |
| 2004/0211471 | A1 | | 10/2004 | Toji et al. | |
| 2007/0006491 | A1 | | 1/2007 | Ioku et al. | |
| 2010/0000211 | A1 | * | 1/2010 | Ikeda | E02F 9/2232 60/422 |
| 2012/0291427 | A1 | * | 11/2012 | Azuma | E02F 3/963 60/420 |

FOREIGN PATENT DOCUMENTS

| JP | 2000-291601 | A | | 10/2000 | |
| JP | 2003-097743 | A | | 4/2003 | |
| JP | 2004-324741 | A | | 11/2004 | |
| JP | 2007-321807 | A | | 12/2007 | |
| JP | 2011-112123 | A | | 6/2011 | |
| JP | 2011112123 | | * | 9/2011 | ............ F15B 11/00 |

\* cited by examiner

MULTIPLE VALVE DEVICE

TECHNICAL FIELD

The present invention relates to a multiple valve device mounted on a construction machine represented by a hydraulic excavator and suitably used for driving/control of a traveling and working hydraulic actuator.

BACKGROUND ART

In general, in order to supply a pressurized oil from a hydraulic source including a hydraulic pump to a hydraulic actuator (a hydraulic motor, a hydraulic cylinder, for example), a construction machine represented by a hydraulic excavator is configured to be provided with a multiple valve device composed of a plurality of spool valves (directional control valves) between the hydraulic actuator and the hydraulic source.

This type of conventional-art multiple valve device includes a valve housing provided with oil passages on a hydraulic source side having a plurality of spool sliding bores and communicating with each of the spool sliding bores and an actuator side and a plurality of spools provided by being inserted in each of the spool sliding bores of the valve housing and selectively communicating with/shutting off the oil passage on the hydraulic source side and the oil passage on the actuator side.

As the valve housing used in such a multiple valve device, three types, that is, a stack type in which three or more housing blocks are made to abut against and to overlap each other on the joining surfaces thereof, a two-split type in which two housing blocks formed by being split into two parts abut against each other at the position of the joining surface, and a mono-block type in which the entirety is formed as a single housing block are known, for example (Patent Documents 1, 2, 3, and 4).

PRIOR ART DOCUMENTS

Patent Documents

Patent Document 1: Japanese Patent Laid-Open No. Hei 4-73404 A
Patent Document 2: Japanese Patent Laid-Open No. 2000-205426 A
Patent Document 3: Japanese Patent Laid-Open No. 2000-291601 A
Patent Document 4: Japanese Patent Laid-Open No. 2011-112123 A

SUMMARY OF THE INVENTION

Incidentally, in the above-described prior arts, when two or more hydraulic pumps are used as a hydraulic source and a maximum pressure in a hydraulic circuit is limited by one relief valve, there is a problem that delivery pressures can easily fluctuate between the two hydraulic pumps. That is, a valve housing of the multiple valve device includes a first pump port to which a first hydraulic pump is connected, a second pump port to which a second hydraulic pump is connected, and the relief valve. However, incase a large difference of length is generated between a first pipeline length from the first pump port to the relief valve and a second pipeline length from the second pump port to the relief valve, the hydraulic pump with the longer pipeline length makes its delivery pressure higher than that of the hydraulic pump with the shorter pipeline length.

The present invention was made in view of the above-described prior-art problems and has an object to provide a multiple valve device in which a relief valve can be arranged at a position substantially in the middle between two hydraulic pumps, for example, so that occurrence of fluctuation can be suppressed in the delivery pressures between the two hydraulic pumps.

(1) In order to solve the above-described problems, the present invention is applied to a multiple valve device comprising: a valve housing in which six or more spool sliding bores communicating with a plurality of oil passages on a hydraulic source side and a plurality of oil passages on an actuator side; and six or more spools provided by being inserted in each of the spool sliding bores of the valve housing and communicating with/shutting off the oil passage on the hydraulic source side and the oil passage on the actuator side.

A feature of a configuration employed by the present invention is that the valve housing is configured to be split into two parts which are a first housing block and a second housing block abutting against and separated away from each other at a position of facing joining surface; three or more spool sliding bores provided in the first housing block in each of the spool sliding bores are configured to be disposed forming a three-dimensional structure in a direction parallel with and in a direction perpendicular to the joining surface; the remaining three or more spool sliding bores provided in the second housing block are configured to be disposed forming another three-dimensional structure in a direction parallel with and in a direction perpendicular to the joining surface; a relief valve for suppressing a maximum pressure in each of the oil passage to a predetermined set pressure or less is provided in one of the first and second housing blocks; and the relief valve is configured to be arranged at a position closer to the joining surface than each of the spool sliding bores provided in the one of housing blocks.

With this arrangement, the one relief valve for keeping the maximum pressure in the circuit (oil passage) to the predetermined set pressure or less can be provided on the one housing block at a position close to the joining surface of the first and second housing blocks. As a result, the one relief valve can be arranged at the position substantially in the middle between the two hydraulic pumps, for example (that is, the position close to the joining surface), and occurrence of fluctuation in the delivery pressures between the two hydraulic pumps can be favorably suppressed.

The multiple valve device can be composed of the first and second housing blocks formed by splitting the valve housing into two parts. The first and second housing blocks can abut against and be separated away from each other at the position of the joining surface faced with each other. In the first housing block, the three or more spool sliding bores among the spool sliding bores can be disposed having an arrangement relationship forming a three-dimensional structure in the direction in parallel with and in the direction perpendicular to the joining surface. In the second housing block, too, the remaining three or more spool sliding bores can be disposed having an arrangement relationship forming another three-dimensional structure in the direction in parallel with and in the direction perpendicular to the joining surface. Thus, when the number of spool sliding bores (spool valves) is to be increased, it can be coped with by enlarging a dimension of the housing block in the direction perpendicular to the joining surface, and there is no need to increase the dimension in the direction in parallel with the joining surface, whereby an area of the joining surface can be made as small as possible.

(2) According to the present invention, it is configured such that the valve housing constitutes a plurality of directional control valves used in a construction machine together with each of the spools provided by being inserted in each of the spool sliding bores. In this case, by mounting the multiple valve device on the construction machine represented by a hydraulic excavator, the multiple valve device can be used as the plurality of directional control valves for individually driving and controlling the traveling hydraulic actuator and the working hydraulic actuator, respectively.

(3) According to the present invention, it is configured such that the first housing block constitutes left-right traveling directional control valves, a work tool directional control valve of a working mechanism, and a spare directional control valve together with the four spools in total provided by being inserted in each of the four spool sliding bores in total; and the second housing block constitutes a pair of boom directional control valves of the working mechanism, a pair of arm directional control valves, and a revolving directional control valve of an upper revolving structure together with the five spools in total provided by being inserted in each of the five spool sliding bores in total.

With this arrangement, on the first housing block side, by providing each of the spools by inserting them in the four spool sliding bores in total, the left-right traveling directional control valves, the directional control valve for a work tool of a working mechanism, the spare directional control valve and the like can be assembled. Moreover, on the second housing block side, by providing each of the spools by inserting them in the five spool sliding bores in total, the boom directional control valve of the working mechanism, the arm directional control valve, the revolving directional control valve for the upper revolving structure and the like can be assembled.

(4) According to the present invention, it is configured such that a first pump port for connecting a first hydraulic pump is provided in the first housing block at a position close to a surface on a side opposite to the joining surface sandwiching each of the spool sliding bores; a second pump port for connecting a second hydraulic pump is provided in the second housing block at a position close to a surface on a side opposite to the joining surface sandwiching each of the spool sliding bores; and the relief valve is configured such that the maximum pressures of the pressurized oil delivered from the first hydraulic pump and the second hydraulic pump are kept to the set pressure or less.

As a result, the first hydraulic pump is connected to the first pump port provided on the first housing block, and the second hydraulic pump is connected to the second pump port provided on the second housing block. In this case, one relief valve can be arranged at a position substantially in the middle between the first and second hydraulic pumps (that is, a position close to the joining surface), and occurrence of fluctuation in the delivery pressure between the two hydraulic pumps can be suppressed.

MODE FOR CARRYING OUT THE INVENTION

Hereinafter, an embodiment of a multiple valve device according to the present invention will be in detail explained with reference to FIGS. 1 to 14 by taking a case in which it is mounted on a hydraulic excavator as a construction machine.

In the description of the embodiment, as a representative example of the multiple valve device, an instance in which four spool sliding bores in total are provided in a first housing block and five spool sliding bores in total are provided in a second housing block are used. However, the multiple valve device according to the present invention is not limited to that, and it may be so configured that three to six spool sliding bores are provided in the first housing block and three to six spool sliding bores are provided in the second housing block in a valve housing in which six to twelve spool sliding bores are provided.

Figure 1:
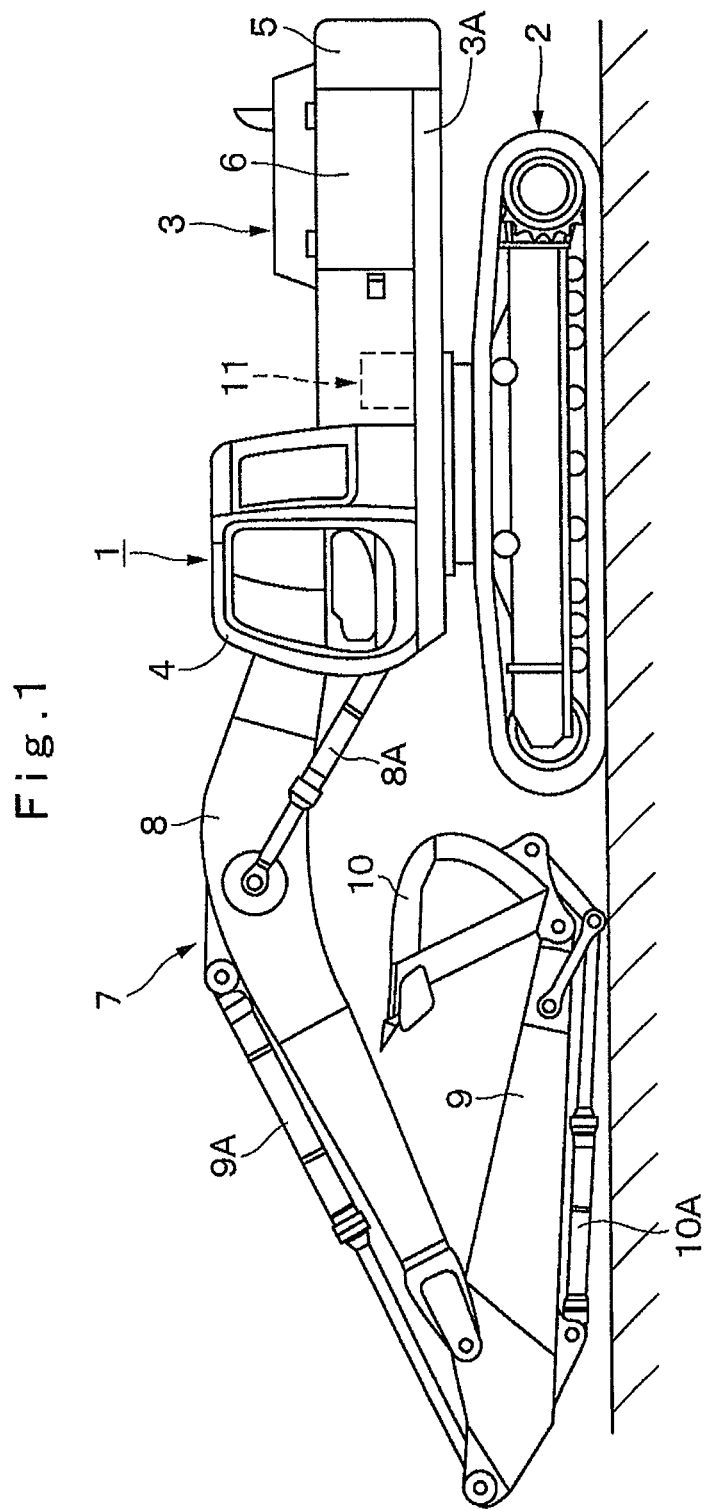
FIG. 1 is a perspective view showing a hydraulic excavator on which a multiple valve device according to an embodiment of the present invention is mounted.

In the figure, designated at 1 is a hydraulic excavator as a construction machine, and as shown in FIG. 1, this hydraulic excavator 1 is roughly constituted by an automotive crawler type lower traveling structure 2, an upper revolving structure 3 rotatably mounted on the lower traveling structure 2, and a working mechanism 7 which will be described later.

In this case, the upper revolving structure 3 of the hydraulic excavator 1 constitutes a vehicle body of the construction machine with the lower traveling structure 2. The upper revolving structure 3 has a revolving frame 3A revolved and driven on the lower traveling structure 2, and a cab 4, a counterweight 5, and a housing cover 6 which will be described later are provided on this revolving frame 3A.

The cab 4 is disposed on a front left side of the revolving frame 3A. The cab 4 is formed as a substantially square box body and defines an operation room inside. Inside the cab 4, an operator's seat on which an operator is seated or sit, an operation lever, and a traveling lever (none of them is shown) are disposed.

The counterweight 5 is provided on a rear end side of the revolving frame 3A. The counterweight 5 is removably mounted on the rear end side of the revolving frame 3A and takes a weight balance of the entire upper revolving structure 3 with respect to the working mechanism 7 on a front side. The housing cover 6 which will be described later for accommodating an engine (not shown) is provided on the front side of the counterweight 5.

The housing cover 6 is installed upright on the revolving frame 3A by being located between the cab 4 and the counterweight 5. This housing cover 6 is formed by using a plurality of metal panels each made of a thin steel plate, for example, and defines a machine room (not shown) accommodating the engine inside. Hydraulic pumps 77 and 79 (See, FIG. 14) which will be described later and are rotated and driven by the engine are provided in the housing cover 6. Moreover, a multiple valve device 11 which will be described later is provided in the housing cover 6 at a position close to the cab 4.

The working mechanism 7 is provided on a front part of the upper revolving structure 3 capable of moving upward/downward. The working mechanism 7 includes a boom 8 having a base end side mounted on the revolving frame 3A, capable of moving upward/downward, an arm 9 mounted on a tip end side of the boom 8, capable of moving upward/downward, and a bucket 10 as a work tool provided rotatably on a tip end side of the arm 9 for performing an excavating work of earth and sand, for example.

The boom 8 of the working mechanism 7 is moved by a boom cylinder 8A upward/downward with respect to the revolving frame 3A, and the arm 9 is moved upward/downward by an arm cylinder 9A on the tip end side of the boom 8. The bucket 10 as a work tool is rotated upward/downward by a bucket cylinder 10A as a cylinder for a work tool on the tip end side of the arm 9.

Subsequently, the multiple valve device 11 employed in this embodiment will be explained.

As shown in FIGS. 2 to 14, this multiple valve device 11 includes a valve housing 12, spools 27, 31, 35, 39, 49, 51, 56, 58, and 62, and a relief valve 88 which will be described later. The valve housing 12 of the multiple valve device 11 is formed by being split into two parts, that is, first and second housing blocks 13 and 14 which will be described later.

Here, the first and second housing blocks 13 and 14 are formed as cuboid blocks extending in left-right direction (X-axis direction in FIG. 2) and in front-rear direction (Y-axis direction) in parallel with joining surfaces 13B and 14A which will be described later and also extending in upper-and-lower direction (Z-axis direction) perpendicular to the joining surfaces 13B and 14A. The first and second housing blocks 13 and 14 abut against each other, capable of being separated, through joining surfaces 13B and 14A.

Designated at 13 is the first housing block which is a half-split body of the valve housing 12, and the first housing block 13 is molded as a casting having a cuboid shape as shown in FIGS. 2 to 7 by using casting means. The first housing block 13 has six surfaces in total composed of an upper one surface 13A (hereinafter referred to as an upper surface 13A), a lower joining surface 13B, front-rear side surfaces 13C and 13D, and left-right side surfaces 13E and 13F.

Figure 2:
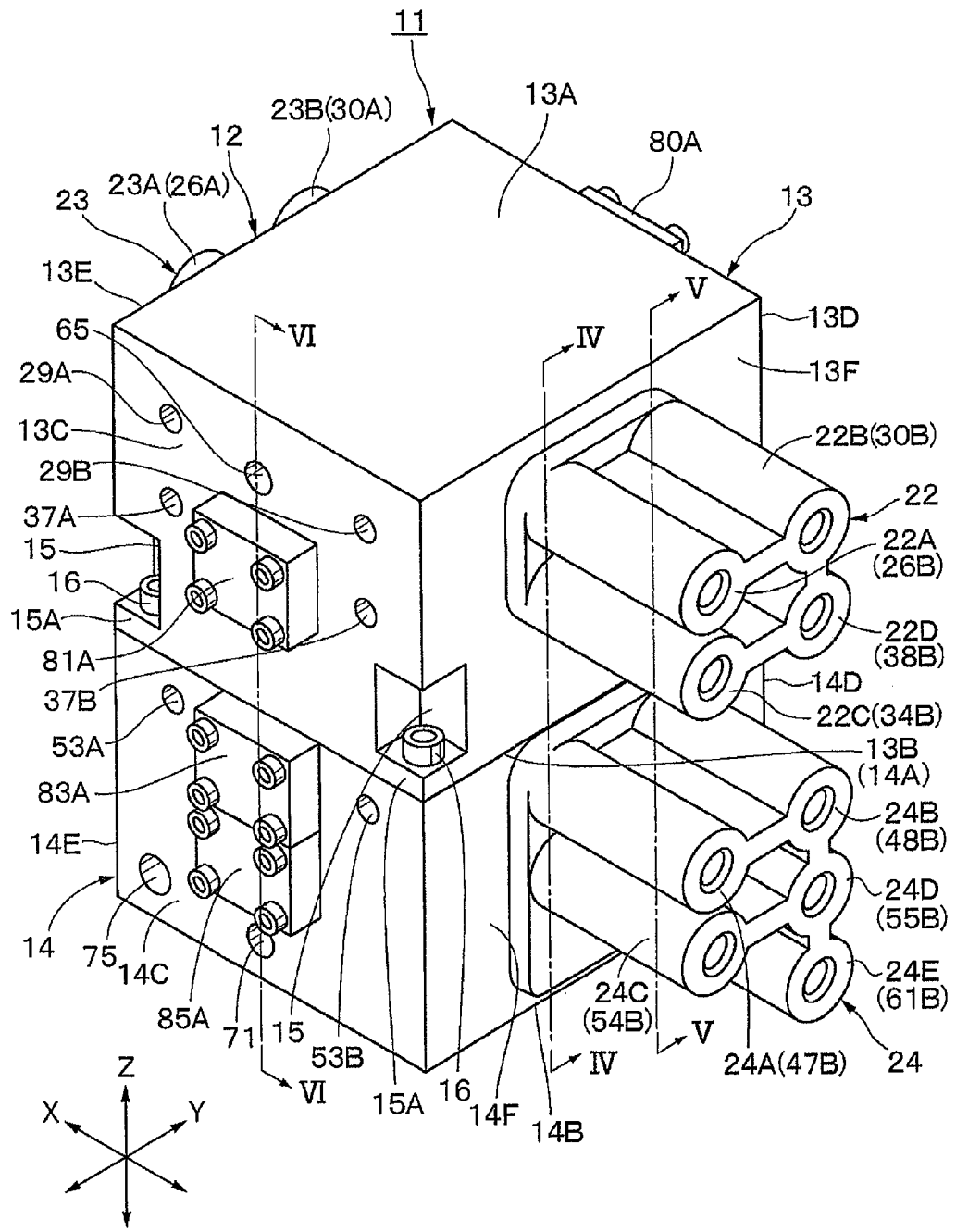
FIG. 2 is a perspective view showing the multiple valve device in FIG. 1 in an enlarged manner.
Figure 3:
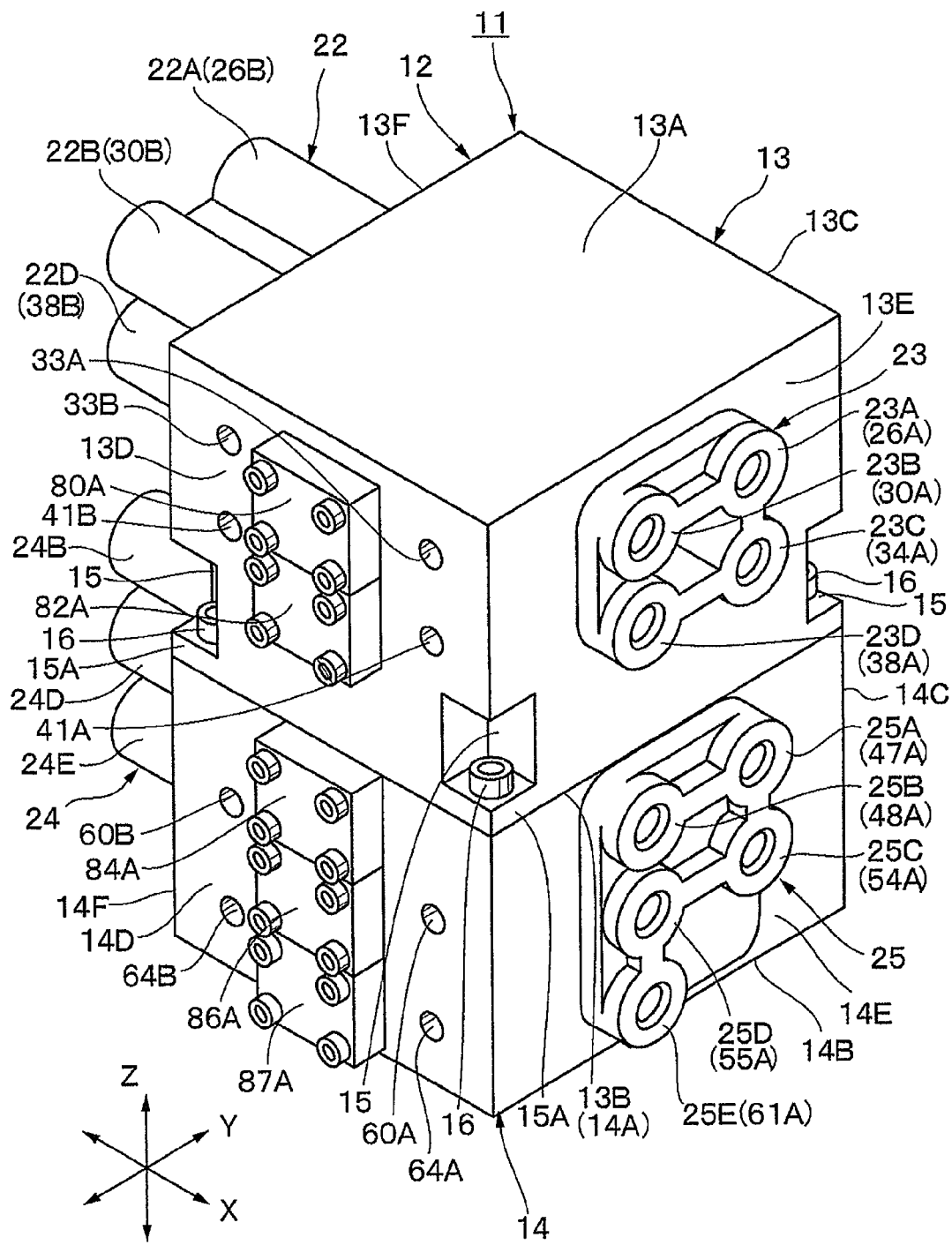
FIG. 3 is a perspective view of the multiple valve device when seen from a side opposite to that in FIG. 2.

As shown in FIG. 2, in the first housing block 13, a pump port 65 which will be described later is opened and provided at a position on an upper side of a cover 81A which will be described later in the front-side side surface 13C. In the front-side side surface 13C, pressurized oil supply/discharge ports 29A and 29B and pressurized oil supply/discharge ports 37A and 37B which will be described later are opened and provided at positions apart from each other in the left-right direction (X-axis direction), respectively. As shown in FIG. 3, in the rear-side side surface 13D, pressurized oil supply/discharge ports 33A and 33B and pressurized oil supply/discharge ports 41A and 41B which will be described later are opened and provided at positions apart from each other in the left-right direction (X-axis direction), respectively.

Designated at 14 is the second housing constituting another half-split body of the valve housing 12. This second housing block 14 is also molded as a cuboid block (casting) by casting means. The second housing block 14 has six surfaces in total composed of an upper joining surface 14A, a lower another surface 14B (hereinafter referred to as a lower surface 14B), front-rear side surfaces 14C and 14D, and left-right side surfaces 14E and 14F.

As shown in FIG. 2, in the second housing block 14, a pump port 71 which will be described later is opened and provided at a position on a lower side of a cover 85A which will be described later in the front-side side surface 14C, and a tank port 75 which will be described later is opened and provided at a position on a left side in the X-axis direction of the pump port 71. Moreover, in the front-side side surface 14C, pressurized oil supply/discharge ports 53A and 53B which will be described later are provided apart from each other in the left-right direction (X-axis direction). As shown in FIG. 3, in the rear-side side surface 14D, pressurized oil supply/discharge ports 60A and 60B and pressurized oil supply/discharge ports 64A and 64B which will be described later are provided apart from each other, respectively, in the left-right direction (X-axis direction).

In the first housing block 13, a plurality of (four in total, for example) recessed parts 15 are formed. These recessed parts 15 are recessed at each of corner parts of the first housing block 13 at positions on an upper side of the joining surface 13B (that is, corner parts between front-rear side surfaces 13C and 13D and the left-right side surfaces 13E and 13F). Each of the recessed parts 15 is formed by cutting away the corner parts in an L-shaped section.

A space between a lower surface side of each of the recessed parts 15 and the joining surface 13B is a seating surface portion 15A for fastening a bolt. Each of the seating surface portions 15A constitutes a fastening portion for fixing (connecting) the first housing block 13 to the second housing block 14 by using a plurality of bolts 16 in an abutting state. The recessed parts 15 form bolt attaching spaces for the bolts 16 at upper side positions of the seating surface portions 15A.

In the second housing block 14, screw holes 17 (See, FIGS. 10 and 13) are formed at positions in the joining surface 14A faced with each of the seating surface portions 15A in a vertical direction, respectively, and the bolts 16 are screwed with these screw holes 17. As a result, the first housing block 13 and the second housing block 14 are fixed in an abutting state by using the bolts 16, four in total and constitute the valve housing 12 of the multiple valve device 11.

Indicated at 18, 19, 20, and 21 are four spool sliding bores provided in the first housing block 13. These spool sliding bores 18 to 21 have a three-dimensional structure similar to a cover member 22 which will be described later (See, FIG. 2) and are arranged in the first housing block 13. As shown in FIGS. 4, 5, 7, and 8, the spool sliding bores 18 to 21 extend in parallel with each other along the X-axis direction and are arranged apart from each other in the Y-axis direction and the Z-axis direction.

Here, the number of spool sliding bores provided in the first housing block 13 is not limited to four, and it may be configured such that three spool sliding bores are provided as the minimum number so as to form the three-dimensional structure. In this case, in the first housing block 13, spool sliding bores 18, 19, and 20, three in total, that is, a traveling left control valve, a traveling right control valve, and a bucket control valve are provided, for example, and the spare control spool sliding bore 21 can be omitted.

Figure 4:
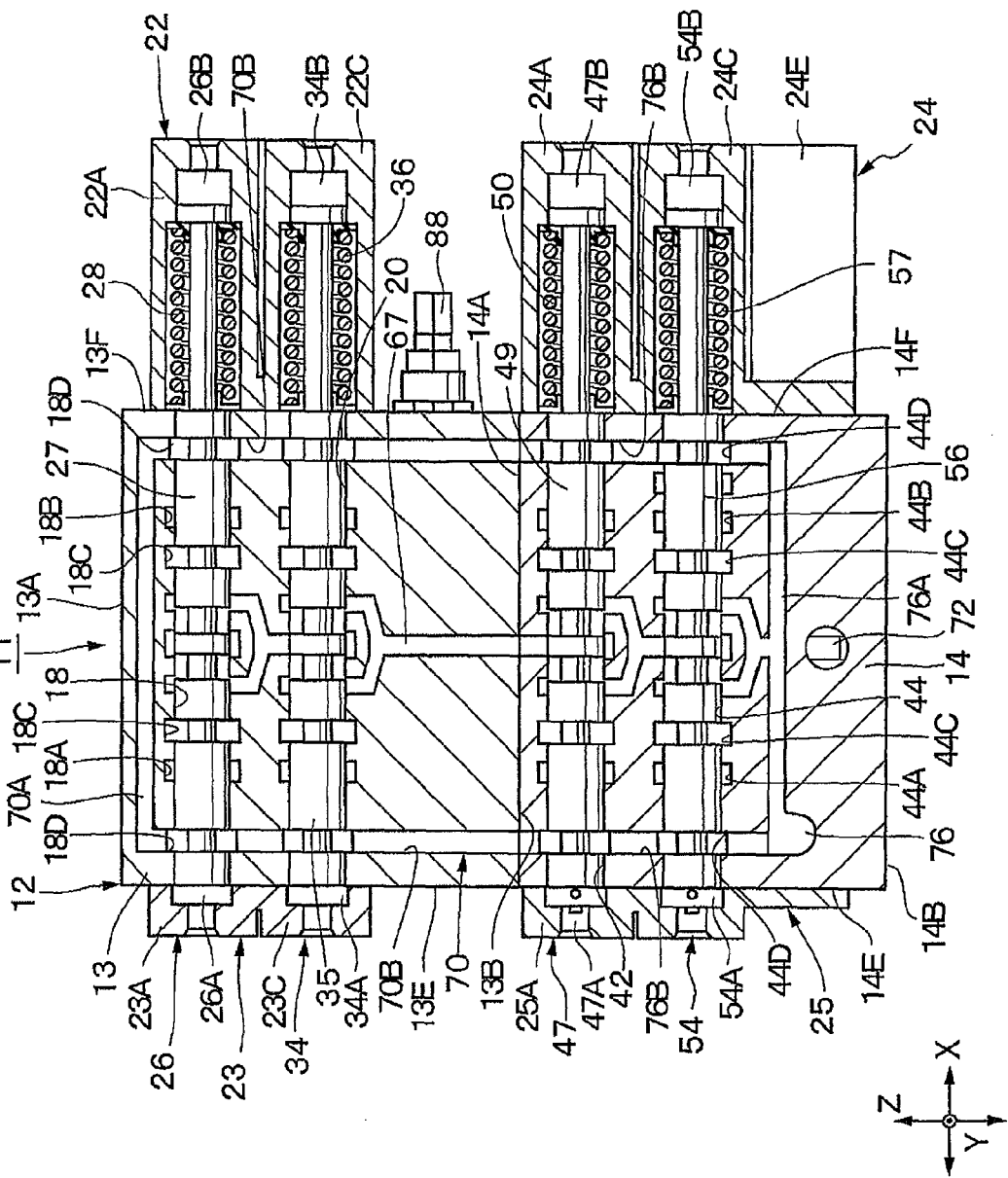
FIG. 4 is a longitudinal sectional view of the multiple valve device when seen from an arrow IV-IV direction in FIG. 2.
Figure 5:
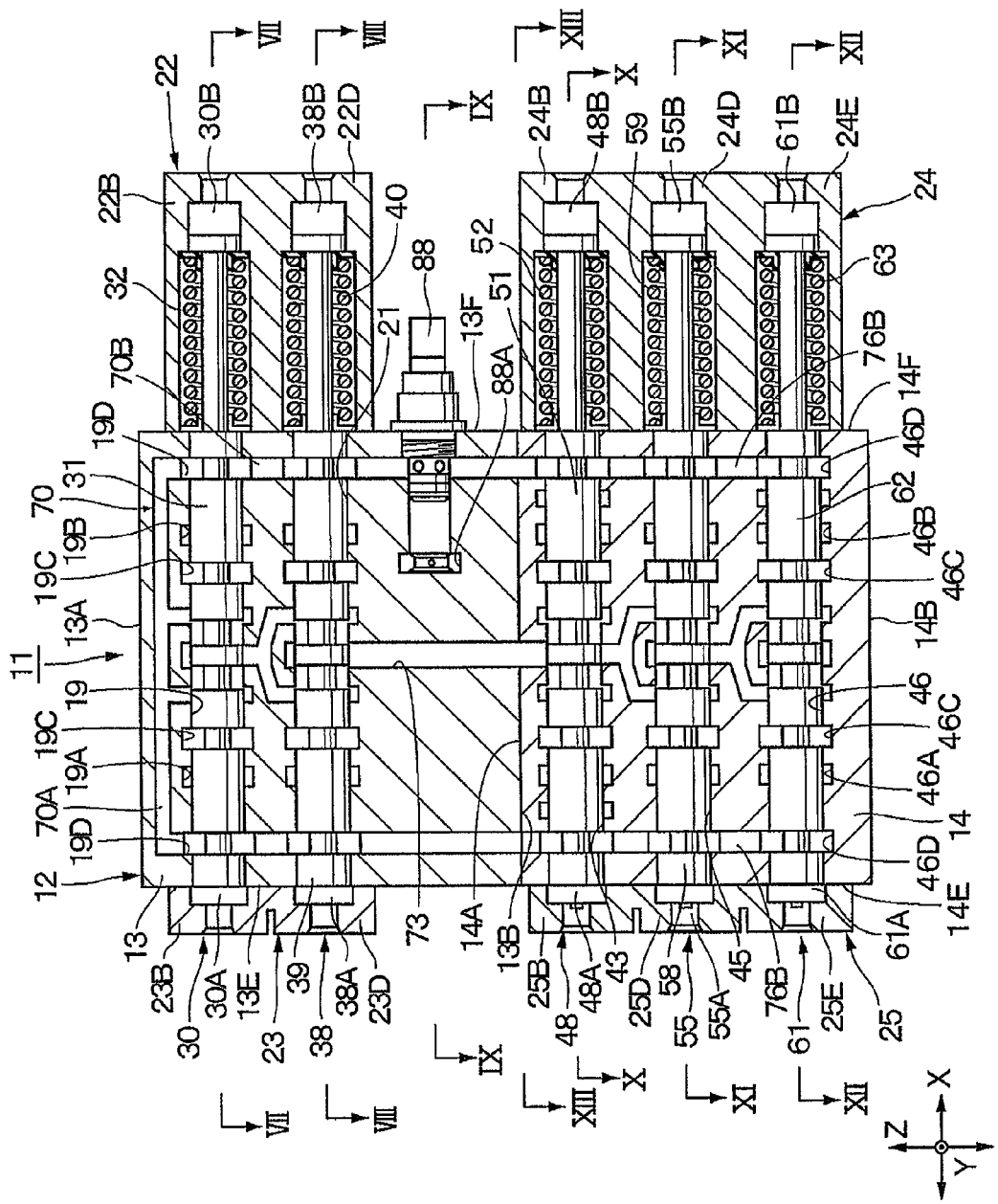
FIG. 5 is a longitudinal sectional view of the multiple valve device when seen from an arrow V-V direction in FIG. 2.
Figure 7:
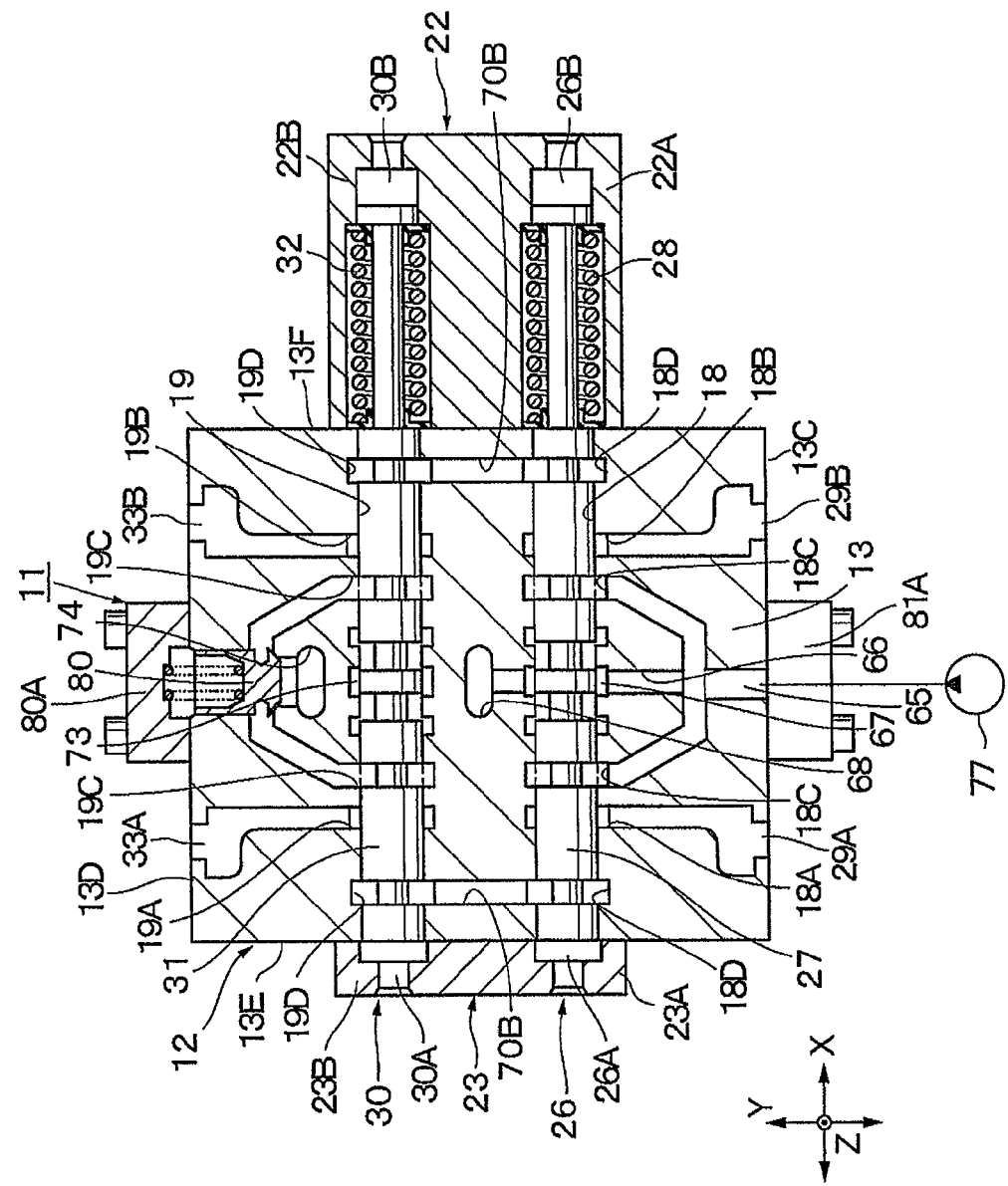
FIG. 7 is a cross sectional view of a first housing block together with left-right traveling control valves when seen from an arrow VII-VII direction in FIG. 5.
Figure 8:
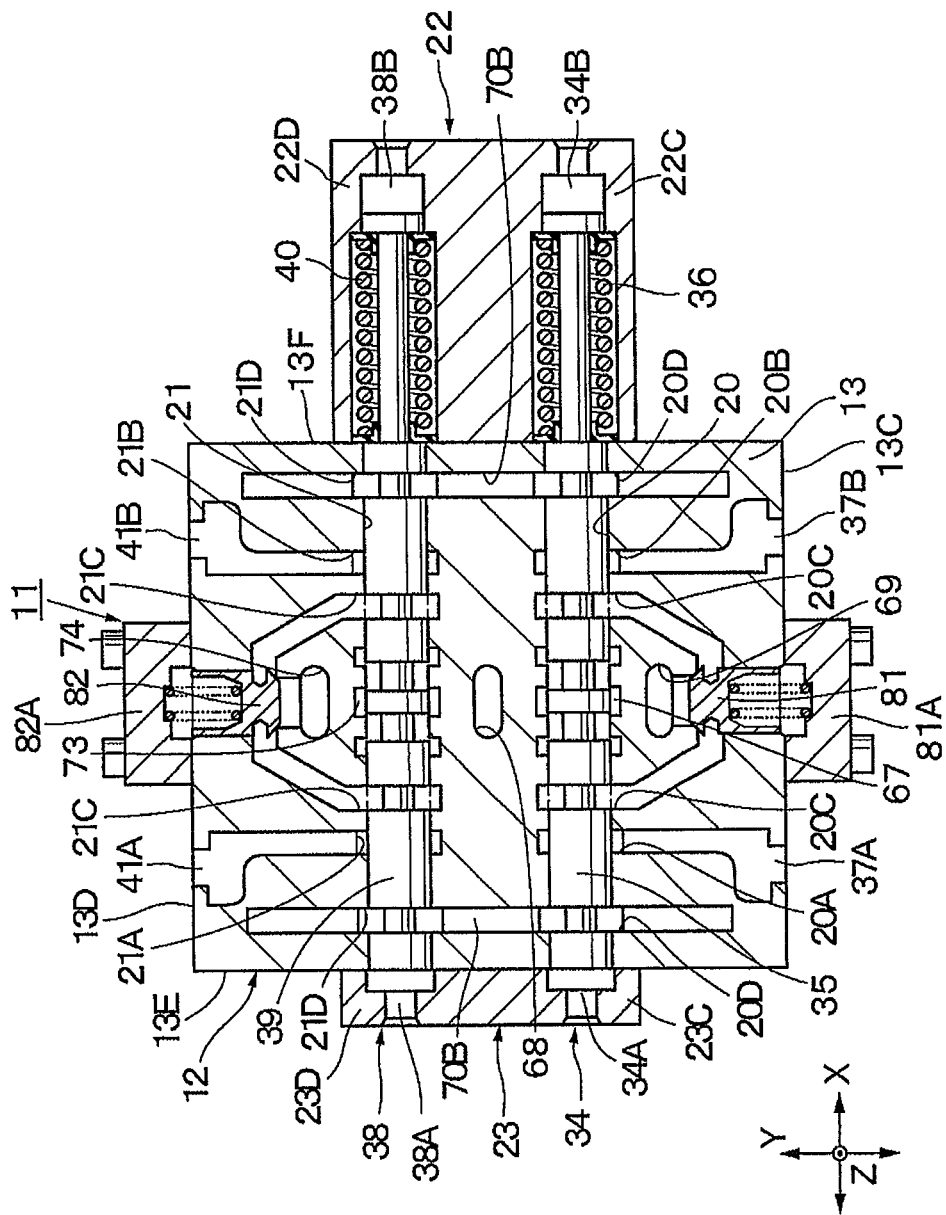
FIG. 8 is a cross sectional view of the first housing block together with a bucket control valve and a spare control valve when seen from an arrow VIII-VIII direction in FIG. 5.

That is, the spool sliding bores 18 and 19 among the spool sliding bores 18 to 21 extend in parallel in the X-axis direction as shown in FIG. 7 and are arranged at a predetermined interval in the Y-axis direction. Moreover, the spool sliding bores 20 and 21 also extend in parallel in the X-axis direction as shown in FIG. 8 and are arranged at a predetermined interval in the Y-axis direction. The spool sliding bores 18 and 20 extend in parallel with each other along the X-axis direction as shown in FIG. 4 and are arranged at a predetermined interval in the Z-axis direction. Moreover, the spool sliding bores 19 and 21 also extend in parallel with each other along the X-axis direction as shown in FIG. 5 and are arranged at a predetermined interval in the Z-axis direction.

Here, as shown in FIG. 7, in the first housing block 13, annular oil grooves 18A and 18B are formed apart from each other in an axial direction on a peripheral wall side of the spool sliding bore 18 and another annular oil grooves 18C and 18C are formed between the oil grooves 18A and 18B. On a peripheral wall side of the spool sliding bore 18, another oil grooves 18D and 18D are formed at positions outside in the axial direction of the oil grooves 18A and 18B.

Among these oil grooves 18A to 18D, the oil grooves 18A and 18B are oil grooves on the pressurized oil supply/discharge side and communicate with traveling right pressurized oil supply/discharge ports 29A and 29B which will be described later and constitute an oil passage on an actuator side. Each of the oil grooves 18C becomes a high-pressure side oil groove and communicates with a first pump passage 66 on the pump port 65 side which will be described later, a relief high-pressure passage 68, and a first high-pressure passage 69. Each of the oil grooves 18D becomes a low-pressure side oil groove and communicates with a side passage 70B of a low-pressure passage 70 on a tank 78 side which will be described later. These oil grooves 18C and 18D constitute an oil passage on a hydraulic source side.

As shown in FIG. 7, in the first housing block 13, on a peripheral wall side of the spool sliding bore 19, oil grooves 19A and 19B on a pressurized oil supply/discharge side constituting an oil passage on the actuator side, oil grooves 19C and 19C on a high pressure side constituting an oil passage on the hydraulic source side, and oil grooves 19D and 19D on a low pressure side are formed apart from each other in the axial direction.

As shown in FIG. 8, on a peripheral wall side of the spool sliding bore 20, oil grooves 20A and 20B on the pressurized oil supply/discharge side constituting an oil passage on the actuator side, oil grooves 20C and 20C on a high pressure side constituting an oil passage on the hydraulic source side, and oil grooves 20D and 20D on a low pressure side are formed apart from each other in the axial direction. On a peripheral wall side of the spool sliding bore 21, oil grooves 21A and 21B on the pressurized oil supply/discharge side constituting an oil passage on the actuator side, oil grooves 21C and 21C on a high pressure side constituting an oil passage on the hydraulic source side, and oil grooves 21D and 21D on a low pressure side are formed apart from each other in the axial direction.

The cover member 22 is provided on the side surface 13F of the first housing block 13. As shown in FIG. 2, this cover member 22 has cylindrical projecting portions 22A, 22B, 22C, and 22D, four in total. These cylindrical projecting portions 22A to 22D constitute hydraulic pilot portions 26B, 30B, 34B, and 38B of the control valves 26, 30, 34, and 38 which will be described later.

As shown in FIGS. 4, 5, 7, and 8, the cylindrical projecting portions 22A, 22B, 22C, and 22D project coaxially with the spool sliding bores 18, 19, 20, and 21 from the side surface 13F of the housing block 13 in the X-axis direction. That is, the cylindrical projecting portions 22A to 22D are disposed having an arrangement relationship of a three-dimensional structure of extending in parallel with each other along the X-axis direction similarly to the spool sliding bores 18 to 21 and of separating apart from each other in the Y-axis direction and the Z-axis direction.

Another cover member 23 is provided on the side surface 13E of the first housing block 13. As shown in FIG. 3, another cover member 23 has short cylindrical portions 23A, 23B, 23C, and 23D, four in total. These cylindrical portions 23A to 23D constitute hydraulic pilot portions 26A, 30A, 34A, and 38A of the control valves 26, 30, 34, and 38 which will be described later.

The cover member 24 is provided on the side surface 14F of the second housing block 14. As shown in FIG. 2, this cover member 24 has cylindrical projecting portions 24A, 24B, 24C, 24D, and 24E, five in total. These cylindrical projecting portions 24A to 24E constitute hydraulic pilot portions 47B, 48B, 54B, 55B, and 61B of the control valves 47, 48, 54, 55, and 61 which will be described later.

As shown in FIGS. 4, 5, and 10 to 12, the cylindrical projecting portions 24A, 24B, 24C, 24D, and 24E project coaxially with spool sliding bores 42, 43, 44, 45, and 46 which will be described later from the side surface 14F of the housing block 14 in the X-axis direction. That is, the cylindrical projecting portions 24A to 24E are disposed having an arrangement relationship of a three-dimensional structure of extending in parallel with each other along the X-axis direction similarly to the spool sliding bores 42 to 46 and of separating away from each other in the Y-axis direction and the Z-axis direction.

Another cover member 25 is provided on the side surface 14E of the second housing block 14. As shown in FIG. 3, this cover member 25 has short cylindrical portions 25A, 25B, 25C, 25D, and 25E, five in total. These cylindrical portions 25A to 25E constitute hydraulic pilot portions 47A, 48A, 54A, 55A, and 61A of the control valves 47, 48, 54, 55, and 61 which will be described later.

Subsequently, the traveling control valves 26 and 30, the bucket control valve 34, the spare control valve 38, the boom control valves 47 and 48, the arm control valves 54 and 55, and the revolution control valve 61 constituting the multiple valve device 11 will be explained.

Indicated at 26 is the traveling right directional control valve (hereinafter referred to as the traveling control valve 26) provided in the first housing block 13. As shown in FIG.

7, this traveling control valve 26 is constituted by the spool valve obtained by inserting the spool 27 into the spool sliding bore 18. The traveling control valve 26 has the left-right hydraulic pilot portions 26A and 26B in the cover members 22 and 23, located on both sides in the axial direction of the spool 27. A spring 28 for urging the spool 27 toward a neutral position all the time is disposed in the right-side hydraulic pilot portion 26B.

Here, to the hydraulic pilot portions 26A and 26B of the traveling control valve 26, a pilot pressure is supplied from an operation valve (not shown) of a traveling lever. The spool 27 of the traveling control valve 26 is displaced in the axial direction in the spool sliding bore 18 in accordance with this pilot pressure and selectively allows the oil grooves 18A and 18B on the actuator side to communicate with/to shut off from the oil grooves 18C and 18D on the hydraulic source side. As a result, the traveling control valve 26 is switched from the neutral position (A) to left-right switching positions (B), (C) in FIG. 14.

Figure 14:
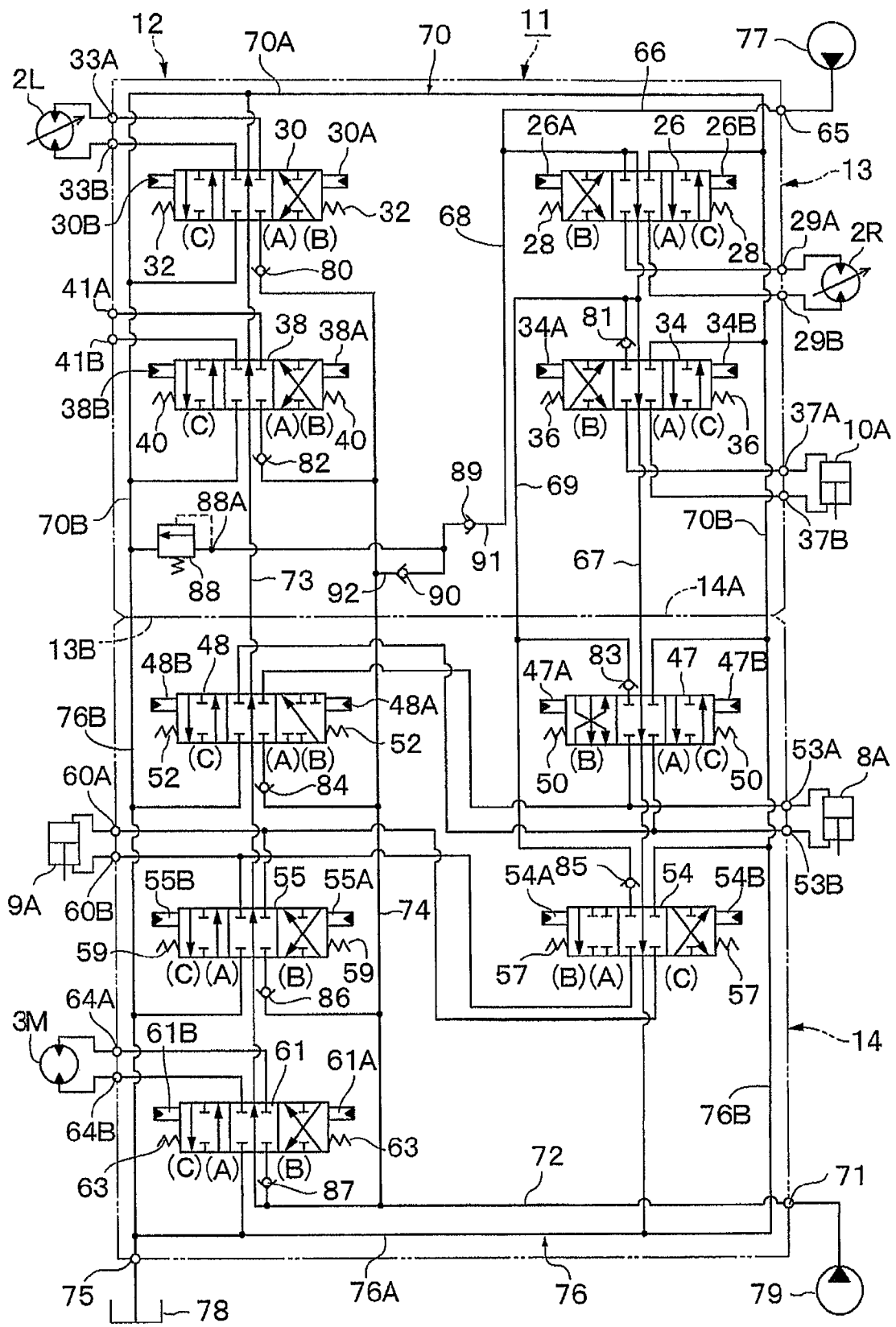
FIG. 14 is a hydraulic circuit diagram of the multiple valve device used in the hydraulic excavator shown in FIG. 1.

The pressurized oil supply/discharge ports 29A and 29B are provided on the side surface 13C of the housing block 13. As shown in FIG. 7, these pressurized oil supply/discharge ports 29A and 29B communicate with the oil grooves 18A and 18B on the actuator side on one hand and are opened in the side surface 13C of the housing block 13 on the other hand as shown in FIG. 2. As shown in FIG. 14, the pressurized oil supply/discharge ports 29A and 29B supply the pressurized oil to a right-side traveling motor 2R, for example, in left-right traveling motors 2L and 2R provided on the lower traveling structure 2 (See, FIG. 1).

Indicated at 30 is the traveling left directional control valve (hereinafter referred to as the traveling control valve 30) provided in the first housing block 13. This traveling control valve 30 is constituted by the spool valve obtained by inserting the spool 31 into the spool sliding bore 19. The traveling control valve 30 has the left-right hydraulic pilot portions 30A and 30B in the cover members 22 and 23, located on both sides in the axial direction of the spool 31. A spring 32 for urging the spool 31 toward a neutral position all the time is disposed in the hydraulic pilot portion 30B.

To the hydraulic pilot portions 30A and 30B of the traveling control valve 30, a pilot pressure is supplied from the operation valve (not shown) of the traveling lever. The spool 31 of the traveling control valve 30 is displaced in the axial direction in the spool sliding bore 19 in accordance with this pilot pressure and selectively allows the oil grooves 19A and 19B on the actuator side to communicate with/to shut off from the oil grooves 19C and 19D on the hydraulic source side. As a result, the traveling control valve 30 is switched from the neutral position (A) to left-right switching positions (B), (C) in FIG. 14.

The other pressurized oil supply/discharge ports 33A and 33B are provided on the side surface 13D of the housing block 13. As shown in FIG. 7, these pressurized oil supply/discharge ports 33A and 33B communicate with the oil grooves 19A and 19B on the actuator side on one hand and are opened in the side surface 13D of the housing block 13 on the other hand as shown in FIG. 3. As shown in FIG. 14, the pressurized oil supply/discharge ports 33A and 33B supply the pressurized oil to a left-side traveling motor 2L, for example, in left-right traveling motors 2L and 2R provided on the lower traveling structure 2 (See, FIG. 1).

Indicated at 34 is the work tool directional control valve (hereinafter referred to as the bucket control valve 34) provided in the first housing block 13. This bucket control valve 34 is constituted by the spool valve obtained by inserting the spool 35 into the spool sliding bore 20. The bucket control valve 34 has the left-right hydraulic pilot portions 34A and 34B provided in the cover members 22 and 23, located on both sides in the axial direction of the spool 35, and a spring 36 for urging the spool 35 toward a neutral position all the time is disposed in the right hydraulic pilot portion 34B.

To the hydraulic pilot portions 34A and 34B of the bucket control valve 34, a pilot pressure is supplied from the operation valve (not shown) of a bucket operation lever. The spool 35 of the bucket control valve 34 is displaced in the axial direction in the spool sliding bore 20 in accordance with this pilot pressure and selectively allows the oil grooves 20A and 20B on the actuator side to communicate with/to shut off from the oil grooves 20C and 20D on the hydraulic source side. As a result, the bucket control valve 34 is switched from the neutral position (A) to left-right switching positions (B), (C) in FIG. 14.

The pressurized oil supply/discharge ports 37A and 37B are provided on the side surface 13C of the housing block 13. As shown in FIG. 8, these pressurized oil supply/discharge ports 37A and 37B communicate with the oil grooves 20A and 20B on the actuator side on one hand and are opened in the side surface 13C of the housing block 13 on the other hand as shown in FIG. 2. The pressurized oil supply/discharge ports 37A and 37B supply the pressurized oil to the bucket cylinder 10A (See, FIG. 1) of the working mechanism 7.

Indicated at 38 is the spare directional control valve provided in the first housing block 13 (hereinafter referred to as the spare control valve 38). As shown in FIG. 8, this spare control valve 38 is constituted by the spool valve obtained by inserting the spool 39 into the spool sliding bore 21. The spare control valve 38 has the left-right hydraulic pilot portions 38A and 38B provided in the cover members 22 and 23, located on both sides in the axial direction of the spool 39, and a spring 40 for urging the spool 39 toward a neutral position all the time is disposed in the right hydraulic pilot portion 38B.

To the hydraulic pilot portions 38A and 38B of the spare control valve 38, a pilot pressure is supplied from the operation valve (not shown) of a spare operation lever. The spool 39 of the spare control valve 38 is displaced in the axial direction in the spool sliding bore 21 in accordance with this pilot pressure and selectively allows the oil grooves 21A and 21B on the actuator side to communicate with/to shut off from the oil grooves 21C and 21D on the hydraulic source side. As a result, the spare control valve 38 is switched from the neutral position (A) to left-right switching positions (B), (C) in FIG. 14.

Other pressurized oil supply/discharge ports 41A and 41B are provided on the side surface 13D of the housing block 13. As shown in FIG. 8, these pressurized oil supply/discharge ports 41A and 41B communicate with the oil grooves 21A and 21B on the actuator side on one hand and are opened in the side surface 13D of the housing block 13 on the other hand as shown in FIG. 3. The pressurized oil supply/discharge ports 41A and 41B supply the pressurized oil to a spare hydraulic actuator (not shown).

Indicated at 42, 43, 44, 45, and 46 are five spool sliding bores provided in the second housing block 14. These spool sliding bores 42 to 46 are arranged in the second housing block 14 by forming a three-dimensional structure corresponding to the cover member 24 (See, FIG. 2). As shown in FIGS. 4, 5, and 10 to 12, the spool sliding bores 42 to 46 extend in parallel with each other along the X-axis direction and arranged apart from each other in the Y-axis direction and in the Z-axis direction.

Here, the number of spool sliding bores provided in the second housing block 14 is not limited to five, and it may be configured such that three spool sliding bores are provided as the minimum number so as to form the three-dimensional structure. In this case, in the second housing block 14, spool sliding bores 42, 44, and 46, three in total, that is, the boom control valve, the arm control valve, and the revolution control valve, for example, and the spool sliding bores 43 and 45 for the boom control valve and the arm control valve can be omitted.

Figure 10:
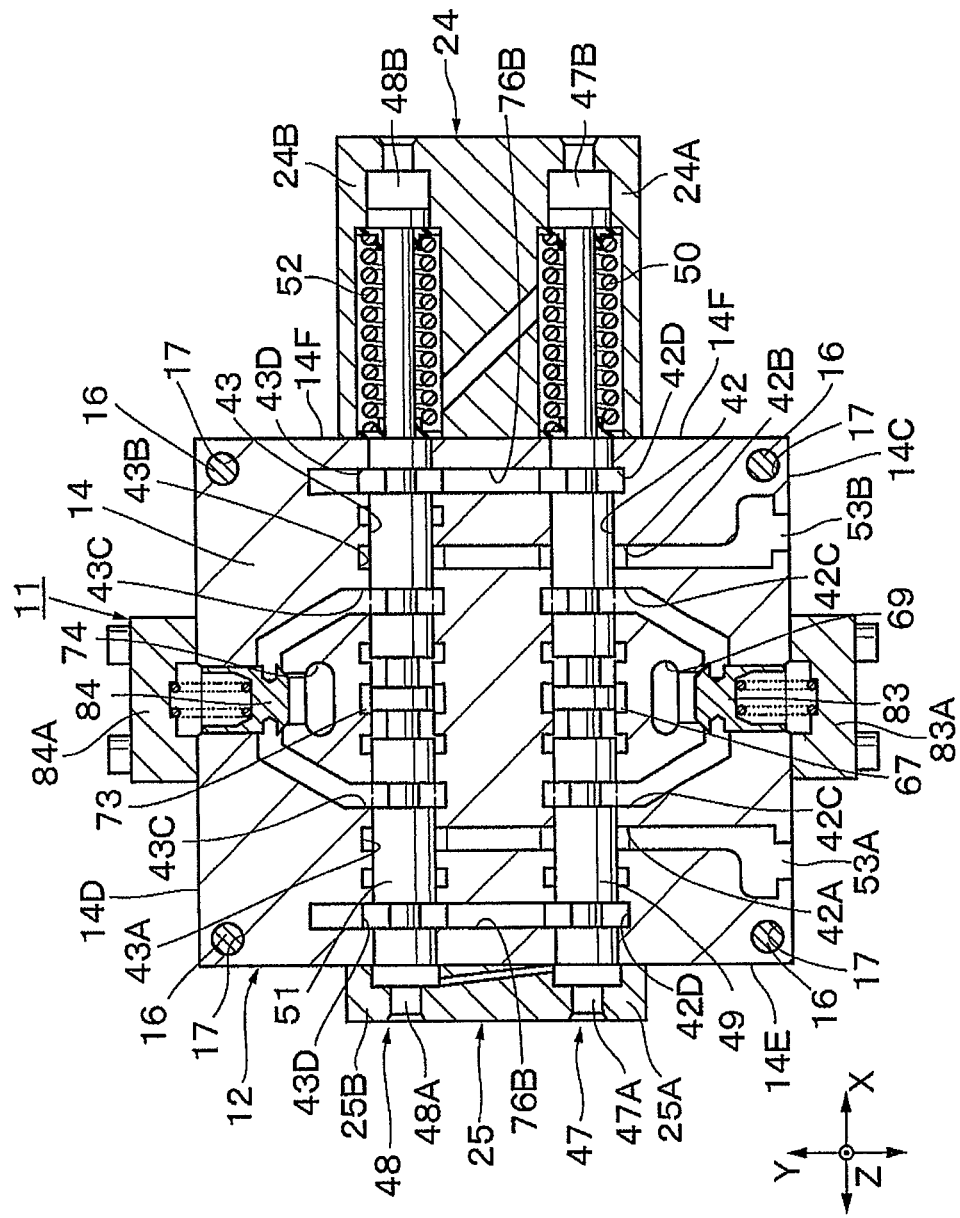
FIG. 10 is across sectional view of the second housing block together with a boom control valve when seen from an arrow X-X direction in FIG. 5.
Figure 11:
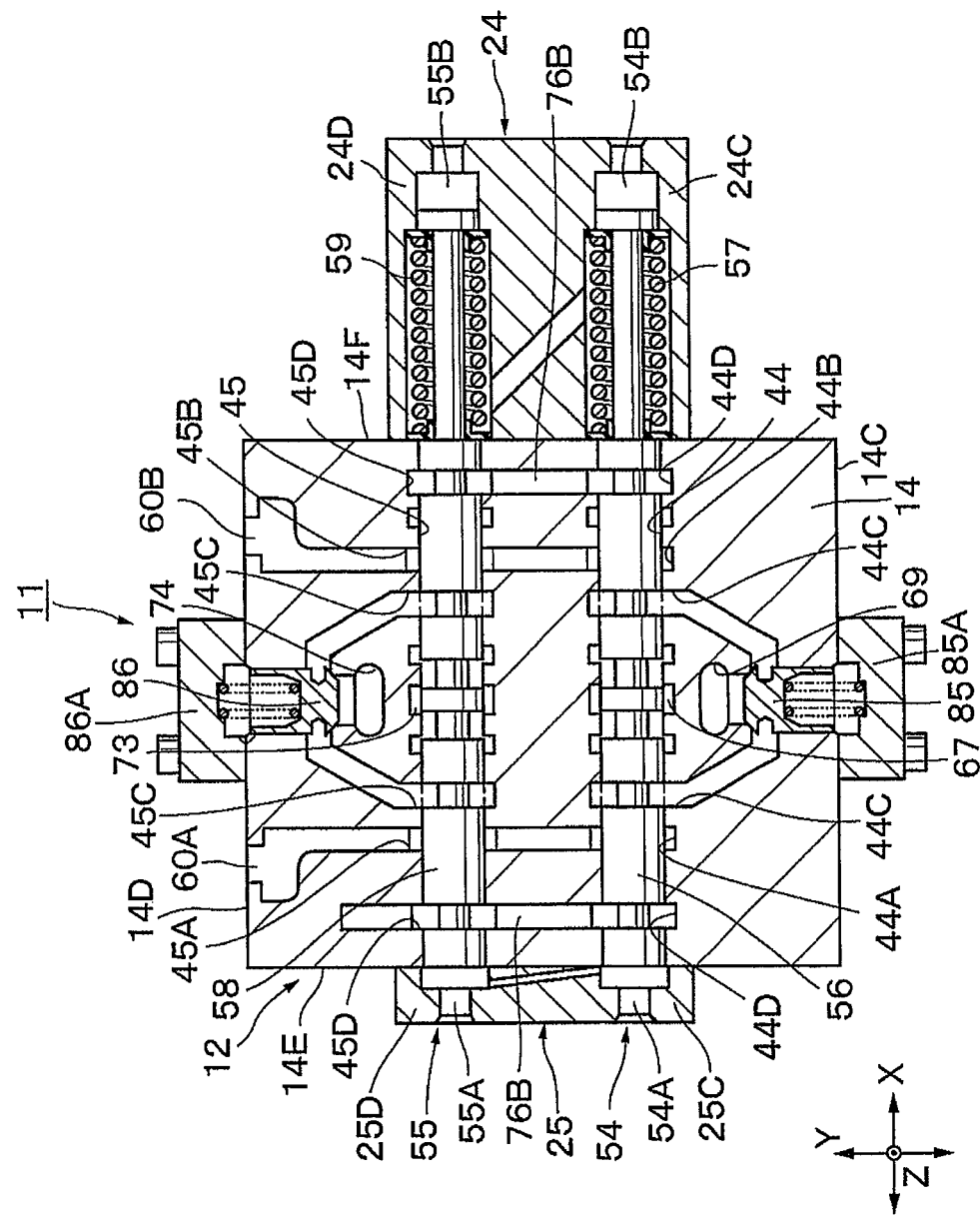
FIG. 11 is across sectional view of the second housing block together with an arm control valve when seen from an arrow XI-XI direction in FIG. 5.

As shown in FIG. 10, the spool sliding bores 42 and 43 extend in parallel in the X-axis direction and are arranged at a predetermined interval in the Y-axis direction. As shown in FIG. 11, the spool sliding bores 44 and 45 extend in parallel in the X-axis direction and are arranged at a predetermined interval in the Y-axis direction. As shown in FIG. 4, the spool sliding bores 42 and 44 extend in parallel with each other in the X-axis direction and are arranged at a predetermined interval in the Z-axis direction. On the other hand, as shown in FIG. 5, the spool sliding bore 45 is arranged away in the Z-axis direction between the spool sliding bores 43 and 46, and these spool sliding bores 43, 45, and 46 extend in parallel with each other in the X-axis direction.

As shown in FIG. 10, in the second housing block 14, annular oil grooves 42A and 42B are formed apart from each other in the axial direction on a peripheral wall side of the spool sliding bore 42 and another annular oil grooves 42C and 42C are formed between the oil grooves 42A and 42B. On a peripheral wall side of the spool sliding bore 42, another oil grooves 42D and 42D are formed at positions outside in the axial direction of the oil grooves 42A and 42B.

Among these oil grooves 42A to 42D, the oil grooves 42A and 42B become oil grooves on the pressurized oil supply/discharge side and communicate with boom pressurized oil supply/discharge ports 53A and 53B which will be described later and constitute an oil passage on an actuator side. Each of the oil grooves 42C becomes a high-pressure side oil groove and communicates with a first high-pressure passage 69 on the first hydraulic pump 77 side which will be described later. Each of the oil grooves 42D becomes a low-pressure side oil groove and communicates with side passages 76B on a tank side which will be described later. These oil grooves 42C and 42D constitute an oil passage on a hydraulic source side.

In the second housing block 14, on a peripheral wall side of the spool sliding bore 43, oil grooves 43A and 43B on the pressurized oil supply/discharge side constituting an oil passage on the actuator side, oil grooves 43C and 43C on the high pressure side constituting an oil passage on the hydraulic source side, and oil grooves 43D and 43D on the low pressure side are formed apart from each other in the axial direction.

As shown in FIG. 11, on a peripheral wall side of the spool sliding bore 44, oil grooves 44A and 44B on the pressurized oil supply/discharge side constituting an oil passage on the actuator side, oil grooves 44C and 44C on the high pressure side constituting an oil passage on the hydraulic source side, and oil grooves 44D and 44D on the low pressure side are formed apart from each other in the axial direction. Oil grooves 45A and 45B on the pressurized oil supply/discharge side constituting the oil passage on the actuator side on the peripheral wall side of the spool sliding bore 45, oil grooves 45C and 45C on the high pressure side constituting the oil passage on the hydraulic source side, and the oil grooves 45D and 45D on the low pressure side are formed apart from each other in the axial direction.

Figure 12:
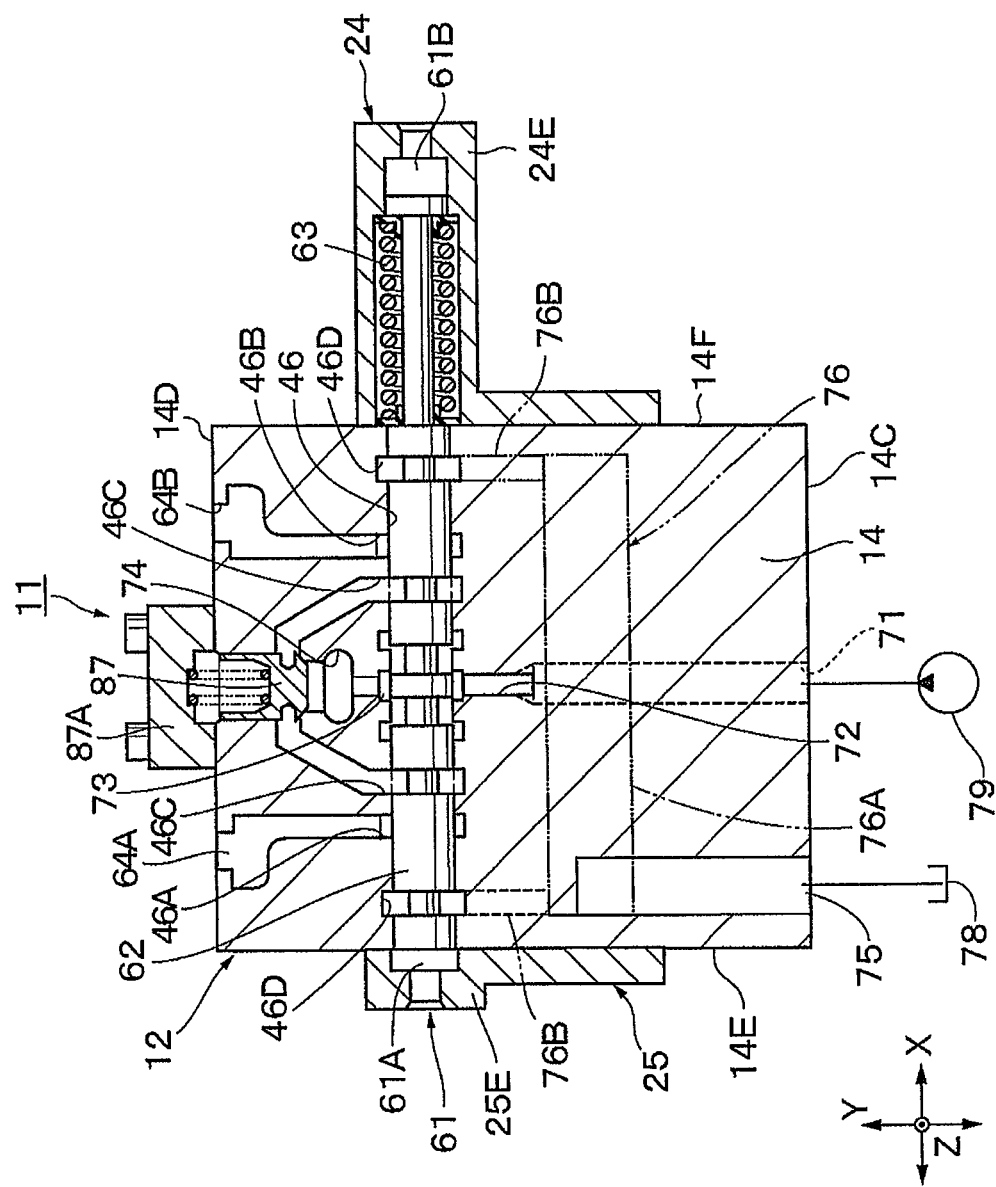
FIG. 12 is across sectional view of the second housing block together with a revolution control valve when seen from an arrow XII-XII direction in FIG. 5.
Figure 13:
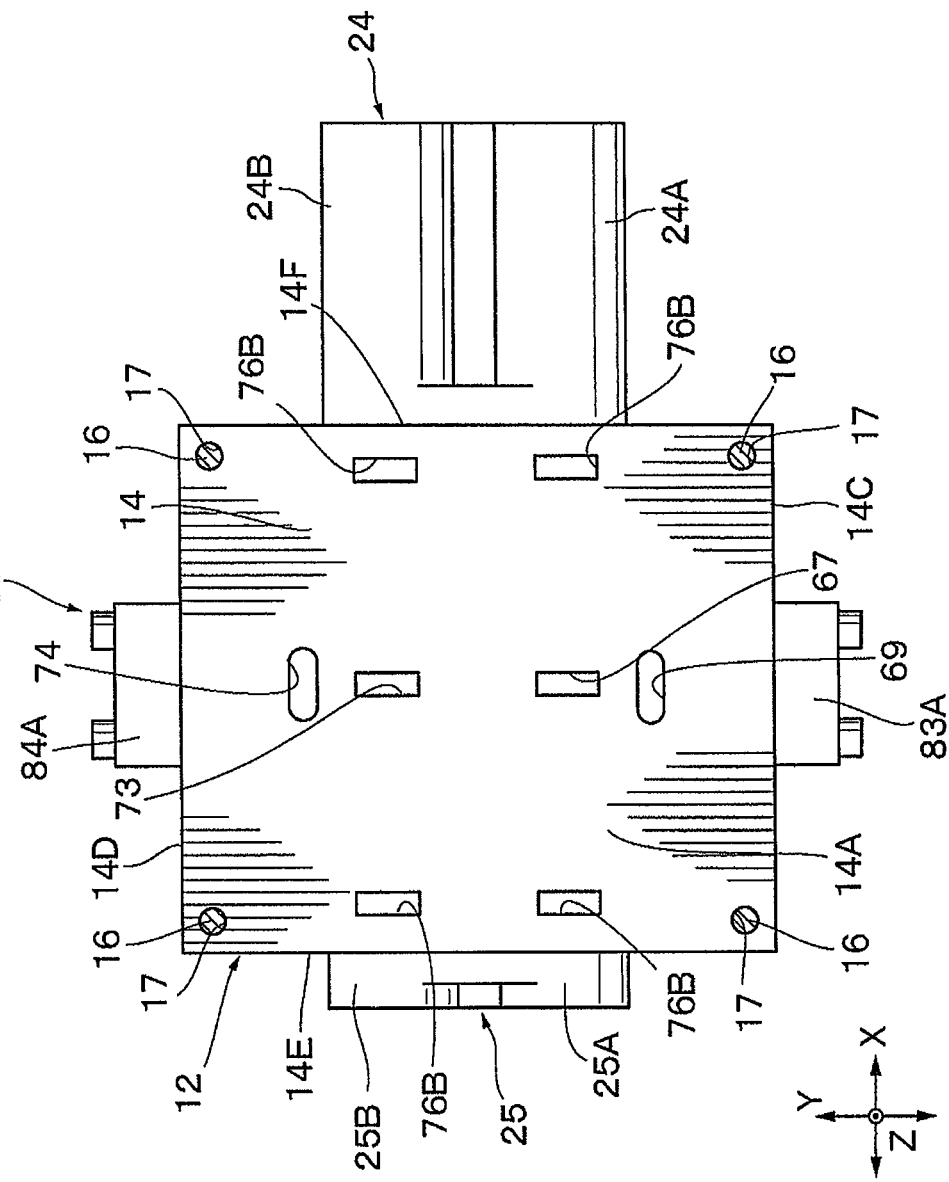
FIG. 13 is across sectional view of the second housing block at a position of a joining surface when seen from an arrow XIII-XIII direction in FIG. 5.

Moreover, as shown in FIG. 12, on a peripheral wall side of the spool sliding bore 46, oil grooves 46A and 46B on the pressurized oil supply/discharge side constituting an oil passage on the actuator side, oil grooves 46C and 46C on the high pressure side constituting an oil passage on the hydraulic source side, and oil grooves 46D and 46D on the low pressure side are formed apart from each other in the axial direction.

Indicated at 47 and 48 are boom directional control valves (hereinafter referred to as boom control valves 47 and 48) provided in the second housing block 14. As shown in FIG. 10, the one boom control valve 47 in these boom control valves 47 and 48 is constituted by a spool valve obtained by inserting the spool 49 into the spool sliding bore 42. The boom control valve 47 has left-right pilot portions 47A and 47B in the cover members 24 and 25, located on both sides in the axial direction of the spool 49. A spring 50 for urging the spool 49 toward the neutral position all the time is disposed in the right-side hydraulic pilot portion 47B.

Here, to the hydraulic pilot portions 47A and 47B of the boom control valve 47, a pilot pressure is supplied from the operation valve (not shown) of a boom operation lever. The spool 49 of the boom control valve 47 is displaced in the axial direction in the spool sliding bore 42 in accordance with this pilot pressure and selectively allows the oil grooves 42A and 42B on the actuator side to communicate with/to shut off from the oil grooves 42C and 42D on the hydraulic source side. As a result, the boom control valve 47 is switched from the neutral position (A) to left-right switching positions (B), (C) in FIG. 14.

The other boom control valve 48 in the boom control valves 47 and 48 is constituted by a spool valve obtained by inserting the spool 51 into the spool sliding bore 43. The boom control valve 48 has left-right hydraulic pilot portions 48A and 48B in the cover members 24 and 25, located on both sides in the axial direction of the spool 51. A spring 52 for urging the spool 51 toward the neutral position all the time is disposed in the right-side hydraulic pilot portion 48B.

Here, to the hydraulic pilot portions 48A and 48B of the boom control valve 48, a pilot pressure is supplied from the operation valve similarly to the above-described boom control valve 47. The spool 51 of the boom control valve 48 is displaced in the axial direction in the spool sliding bore 43 in accordance with this pilot pressure and selectively allows the oil grooves 43A and 43B on the actuator side to communicate with/to shut off from the oil grooves 43C and 43D on the hydraulic source side. As a result, the boom control valve 48 is switched from the neutral position (A) to left-right switching positions (B), (C) in FIG. 14.

The pressurized oil supply/discharge ports 53A and 53B are provided on the side surface 14C of the housing block 14. As shown in FIG. 10, these pressurized oil supply/discharge ports 53A and 53B communicate with the oil grooves 42A and 42B and the oil grooves 43A and 43B on the actuator side on one hand and are opened in the side surface 14C of the housing block 14 on the other hand as shown in FIG. 2. The pressurized oil supply/discharge ports 53A and 53B supply the pressurized oil to the boom cylinder 8A of the working mechanism 7 (See, FIG. 1). That is, the boom control valves 47 and 48 supply the pressurized oil to the boom cylinder 8A of the working mechanism 7 through the common pressurized oil supply/discharge ports 53A and 53B.

Indicated at 54 and 55 are arm directional control valves (hereinafter referred to as arm control valves 54 and 55) provided in the second housing block 14. As shown in FIG. 11, the one arm control valve 54 in these arm control valves 54 and 55 is constituted by a spool valve obtained by inserting the spool 56 into the spool sliding bore 44. The arm control valve 54 has left-right hydraulic pilot portions 54A and 54B in the cover members 24 and 25, located on both sides in the axial direction of the spool 56. A spring 57 for urging the spool 56 toward the neutral position all the time is disposed in the right-side hydraulic pilot portion 54B.

Here, to the hydraulic pilot portions 54A and 54B of the arm control valve 54, a pilot pressure is supplied from the operation valve (not shown) of an arm operation lever. The spool 56 of the arm control valve 54 is displaced in the axial direction in the spool sliding bore 44 in accordance with this pilot pressure and selectively allows the oil grooves 44A and 44B on the actuator side to communicate with/to shut off from the oil grooves 44C and 44D on the hydraulic source side. As a result, the arm control valve 54 is switched from the neutral position (A) to left-right switching positions (B), (C) in FIG. 14.

The other arm control valve 55 in the arm control valves 54 and 55 is constituted by a spool valve obtained by inserting the spool 58 into the spool sliding bore 45. The arm control valve 55 has left-right pilot portions 55A and 55B in the cover members 24 and 25, located on both sides in the axial direction of the spool 58. A spring 59 for urging the spool 58 toward the neutral position all the time is disposed in the right-side hydraulic pilot portion 55B.

Here, to the hydraulic pilot portions 55A and 55B of the arm control valve 55, a pilot pressure is supplied from the operation valve similarly to the above-described arm control valve 54. The spool 58 of the arm control valve 55 is displaced in the axial direction in the spool sliding bore 45 in accordance with this pilot pressure and selectively allows the oil grooves 45A and 45B on the actuator side to communicate with/to shut off from the oil grooves 45C and 45D on the hydraulic source side. As a result, the arm control valve 55 is switched from the neutral position (A) to the switching positions (B), (C) in FIG. 14 and supplies the pressurized oil to the pressurized oil supply/discharge ports 60A and 60B sides which will be described later together with the arm control valve 54.

The pressurized oil supply/discharge ports 60A and 60B are provided on the side surface 14D of the housing block 14. As shown in FIG. 11, these pressurized oil supply/discharge ports 60A and 60B communicate with the oil grooves 44A and 44B and the oil grooves 45A and 45B on the actuator side on one hand and are opened in the side surface 14D of the housing block 14 on the other hand as shown in FIG. 3. The pressurized oil supply/discharge ports 60A and 60B supply the pressurized oil to the arm cylinder 9A of the working mechanism 7 (See, FIG. 1). That is, the arm control valves 54 and 55 supply the pressurized oil to the arm cylinder 9A of the working mechanism 7 through the common pressurized oil supply/discharge ports 60A and 60B.

Indicated at 61 is a revolution directional control valve (hereinafter referred to as the revolution control valve 61) provided in the second housing block 14. As shown in FIG. 12, this revolution control valve 61 is constituted by a spool valve obtained by inserting the spool 62 into the spool sliding bore 46. The revolution control valve 61 has left-right hydraulic pilot portions 61A and 61B in the cover members 24 and 25, located on both sides in the axial direction of the spool 62. A spring 63 for urging the spool 62 toward the neutral position all the time is disposed in the right-side hydraulic pilot portion 61B.

Here, to the hydraulic pilot portions 61A and 61B of the revolution control valve 61, a pilot pressure is supplied from the operation valve (not shown) of a revolution operation lever. The spool 62 of the revolution control valve 61 is displaced in the axial direction in the spool sliding bore 46 in accordance with this pilot pressure and selectively allows the oil grooves 46A and 46B on the actuator side to communicate with/to shut off from the oil grooves 46C and 46D on the hydraulic source side. As a result, the revolution control valve 61 is switched from the neutral position (A) to the switching positions (B), (C) in FIG. 14.

The pressurized oil supply/discharge ports 64A and 64B are provided on the side surface 14C of the housing block 14. As shown in FIG. 12, these pressurized oil supply/discharge ports 64A and 64B communicate with the oil grooves 46A and 46B on the actuator side on one hand and are opened in the side surface 14D of the housing block 14 on the other hand as shown in FIG. 3. As shown in FIG. 14, the pressurized oil supply/discharge ports 64A and 64B supply the pressurized oil to a revolution motor 3M provided on the upper revolving structure 3 (See, FIG. 1) side.

Subsequently, the first and second pump ports 65 and 71, the first and second pump passages 66 and 72, the first and second center bypass passages 67, 73, the relief high-pressure passage 68, the first and second high-pressure passages 69 and 74, the low-pressure passage 70, the tank port 75, a tank passage 76, the first and second hydraulic pumps 77 and 79, and the relief valve 88 provided on the valve housing 12 of the multiple valve device 11 will be explained.

Here, the pressurized oil delivered from the first hydraulic pump 77 is supplied to the first pump port 65, the first pump passage 66, the first center bypass passage 67, the relief high-pressure passage 68, and the first high-pressure passage 69. The first pump port 65, the first pump passage 66, and the relief high-pressure passage 68 are provided on the first housing block 13. The first center bypass passage 67 and the first high-pressure passage 69 extend from the first housing block 13 to the second housing block 14 through the joining surfaces 13B and 14A.

The pressurized oil delivered from the second hydraulic pump 79 is supplied to the second pump port 71, the second pump passage 72, the second center bypass passage 73, and the second high-pressure passage 74. The second pump port 71 and the second pump passage 72 are provided on the second housing block 14. The second center bypass passage 73 and the second high-pressure passage 74 extend from the second housing block 14 to the first housing block 13 through the joining surfaces 13B and 14A.

Figure 6:
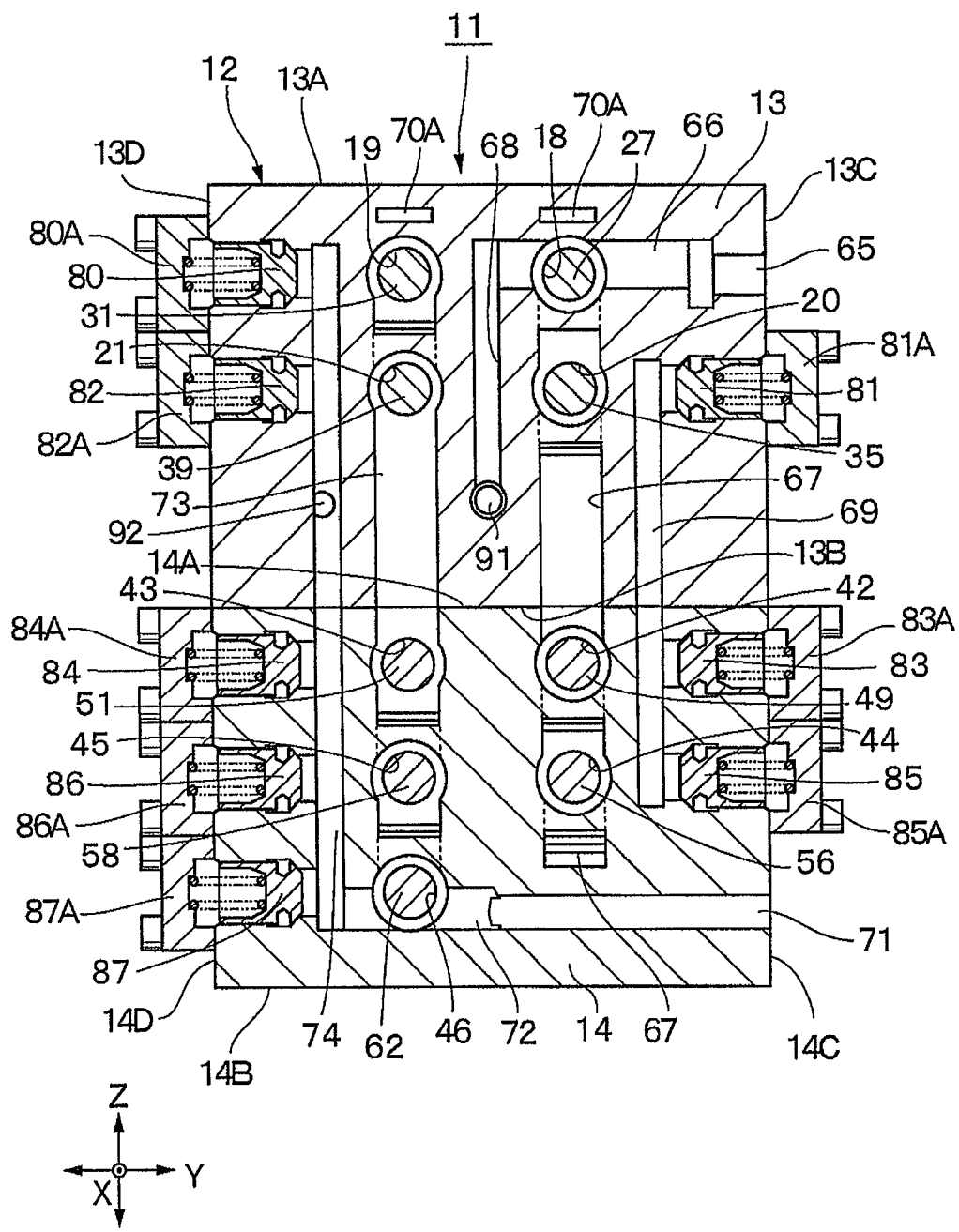
FIG. 6 is a longitudinal sectional view of the multiple valve device when seen from an arrow VI-VI direction in FIG. 2.

The first pump port 65 is provided on the side surface 13C of the first housing block 13. As shown in FIG. 2, this first pump port 65 is opened at a center part of the side surface 13C at a position on an upper side of the cover 81A which will be described later and is connected to a delivery side of the first hydraulic pump 77 which will be described later. The first pump port 65 is provided by being opened on the side surface 13C of the first housing block 13 at a position close to the upper surface 13A on the side opposite to the joining surface 13B sandwiching each of the spool sliding bores 18, 19, 20, and 21. As shown in FIG. 6, the first pump port 65 communicates with the first pump passage 66, the first center bypass passage 67, the relief high-pressure passage 68, and the first high-pressure passage 69 drilled in the first housing block 13.

As shown in FIGS. 7 and 14, the first center bypass passage 67 and the relief high-pressure passage 68 communicate with the first pump port 65 through the first pump passage 66. That is, the first center bypass passage 67 has its upstream end connected to the pump passage 66 and its downstream end connected to the tank passage 76 which will be described later. The relief high-pressure passage 68 has its upstream end connected to the pump passage 66 and its downstream end connected to a first relief passage 91 which will be described later. As also shown in a hydraulic circuit in FIG. 14, the first high-pressure passage 69 is a passage branching from the first center bypass passage 67 and is disposed at a position closer to the side surface 13C of the housing block 13 than the first center bypass passage 67 (See, FIGS. 8 and 9). As shown in FIG. 6, the first center bypass passage 67 and the first high-pressure passage 69 are formed by extending in the vertical direction (Z-axis direction) from the first housing block 13 into the second housing block 14.

Thus, the first center bypass passage 67 is liquid-tightly connected vertically through joining surfaces 13B and 14A as shown in FIG. 6. On the other hand, the first high-pressure passage 69 is also liquid-tightly connected vertically through the joining surfaces 13B and 14A. Here, the first pump passage 66 and the first high-pressure passage 69 supply the pressurized oil delivered from the first hydraulic pump 77 to the traveling control valve 26, the bucket control valve 34, the boom control valve 47, and the arm control valve 54.

The low-pressure passage 70 is formed in the first housing block 13. As shown in FIGS. 4 to 9, this low-pressure passage 70 is formed at a position apart from the first pump passage 66, the first center bypass passage 67, the relief high-pressure passage 68, and the first high-pressure passage 69. The low-pressure passage 70 includes a plurality of (two) upper passages 70A extending along the upper surface 13A of the first housing block 13 and left-right side passages 70B having upper end sides communicate with each of the upper passages 70A and extending downward along the left-right side surfaces 13E and 13F of the first housing block 13.

Each of the side passages 70B of the low-pressure passage 70 has its lower end side communicate with each of the side passages 76B of the tank passage 76 which will be described later at the position of the joining surface 13B. Thus, a hydraulic oil (return oil from each of the hydraulic actuators) flows through the upper passage 70A and the side passage 70B of the low-pressure passage 70 is discharged to the tank 78 which will be described later through the tank passage 76.

The second pump port 71 is provided on the side surface 14C of the housing block 14. As shown in FIG. 2, this second pump port 71 is opened at a center part of the side surface 14C at a position on a lower side of the cover 85A which will be described later and is connected to a delivery side of the second hydraulic pump 79 which will be described later. The second pump port 71 is provided by being opened on the side surface 14C of the second housing block 14 at a position close to the lower surface 14B on the side opposite to the joining surface 14A sandwiching each of the spool sliding bores 42, 43, 44, 45, and 46. The second pump port 71 communicates with the second pump passage 72 drilled in the second housing block 14 and also communicates with the second center bypass passage 73 and the second high-pressure passage 74. The second center bypass passage 73 and the second high-pressure passage 74 are formed so as to extend in the Z-axis direction from the second housing block 14 to the first housing block 13.

As shown in FIG. 6, the second high-pressure passage 74 is disposed at a position closer to the side surfaces 13D and 14D of the housing blocks 13 and 14 than the second center bypass passage 73. The second center bypass passage 73 and the second high-pressure passage 74 are formed by extending upward from the second housing block 14 into the first housing block 13.

Thus, the second center bypass passage 73 and the second high-pressure passage 74 are liquid-tightly connected vertically through the joining surfaces 13B and 14A. The second high-pressure passage 74 supplies the pressurized oil delivered from the second hydraulic pump 79 which will be described later to the revolution control valve 61, the arm control valve 55, the boom control valve 48, the spare control valve 38, and the traveling control valve 30.

The tank port 75 is provided on the side surface 14C of the second housing block 14. As shown in FIG. 2, this tank port 75 is opened in the side surface 14C at a position apart from the second pump port 71 in a left direction and is connected to the tank 78 which will be described later. As shown in FIG. 12, the tank port 75 communicates with the left-right side passages 76B through the lower passage 76A of the tank passage 76 and discharges the hydraulic oil (return oil from each of the hydraulic actuators) flowing through these side passages 76B to the tank 78.

As shown in FIGS. 4 and 5, each of the side passages 76B is formed by being largely separated into the left-right (X-axis direction) in the second housing block 14. This side passage 76B is liquid-tightly connected to the side passage 70B of the low-pressure passage 70 formed in the first housing block 13 at the positions of the joining surfaces 13B and 14A.

The first hydraulic pump 77 constitutes a first hydraulic source together with the tank 78. As shown in FIGS. 6 and 7, the first hydraulic pump 77 has its delivery side connected to the first pump port 65 and supplies the pressurized oil to the control valves 26, 34, 47, and 54 through the first pump passage 66 and the first high-pressure passage 69 and the like. As shown also in FIG. 14, the traveling control valve 26 in these control valves 26, 34, 47, and 54 is arranged at a position on the uppermost side with respect to a flow of the pressurized oil supplied from the first hydraulic pump 77. The first high-pressure passage 69 branches from a middle portion of the first center bypass passage 67 located between the traveling control valve 26 and the bucket control valve 34 and is connected to the first center bypass passage 67 at this middle portion. On the other hand, the relief high-pressure passage 68 is connected to the first pump passage 66 at a position closer to an upstream side than the traveling control valve 26 with respect to the flow of the pressurized oil supplied from the first hydraulic pump 77.

The second hydraulic pump 79 constitutes a second hydraulic source together with the tank 78. As shown in FIGS. 6 and 12, the second hydraulic pump 79 has its delivery side connected to the second pump port 71 and supplies the pressurized oil to the control valves 61, 55, 48, 38, and 30 through the second pump passage 72 and the second high-pressure passage 74 and the like. As shown also in FIG. 14, the revolution control valve 61 in these control valves 61, 55, 48, 38, and 30 is arranged at a position on the uppermost side with respect to a flow of the pressurized oil supplied from the second hydraulic pump 79. The second high-pressure passage 74 is connected to the second pump passage 72 at a position closer to the upstream side than the revolution control valve 61 with respect to the flow of the pressurized oil supplied from the second hydraulic pump 79. The second center bypass passage 73 is also connected to the second pump passage 72 at a position closer to the upstream side than the revolution control valve 61.

A check valve 80 is attached to the traveling control valve 30. As shown in FIG. 7, this check valve 80 is mounted so as to be fitted in toward the second high-pressure passage 74 side from the side surface 13D of the housing block 13, and a gap between itself and the side surface 13D is closed by a cover 80A. The check valve 80 allows the pressurized oil to flow from the second high-pressure passage 74 toward the oil groove 19C side and prevents a flow in an opposite direction.

A check valve 81 is attached to the bucket control valve 34. As shown in FIG. 8, this check valve 81 is mounted so as to be fitted in toward the first high-pressure passage 69 side from the side surface 13C of the housing block 13, and a gap between itself and the side surface 13C is closed by the cover 81A. The check valve 81 allows the pressurized oil to flow from the first high-pressure passage 69 toward the oil groove 20C side and prevents a flow in an opposite direction.

Another check valve 82 is attached to the spare control valve 38. The check valve 82 is constituted substantially similarly to the above-described check valve 80, and a cover 82A is provided on the side surface 13D side of the housing block 13. The check valve 82 allows the pressurized oil to flow from the second high-pressure passage 74 toward the oil groove 21C side and prevents a flow in an opposite direction.

Moreover, in the second housing block 14, too, check valves 83 to 86 are provided. As shown in FIG. 10, the check valve 83 is attached to the boom control valve 47, and the check valve 84 is attached to the boom control valve 48. These check valves 83 and 84 are provided with covers 83A and 84A, respectively. As shown in FIG. 11, the check valve 85 is attached to the arm control valve 54, and the check valve 86 is attached to the arm control valve 55. These check valves 85 and 86 are provided with covers 85A and 86A, respectively. As shown in FIG. 12, the check valve 87 is attached to the revolution control valve 61, and the check valve 87 is provided with a cover 87A.

Figure 9:
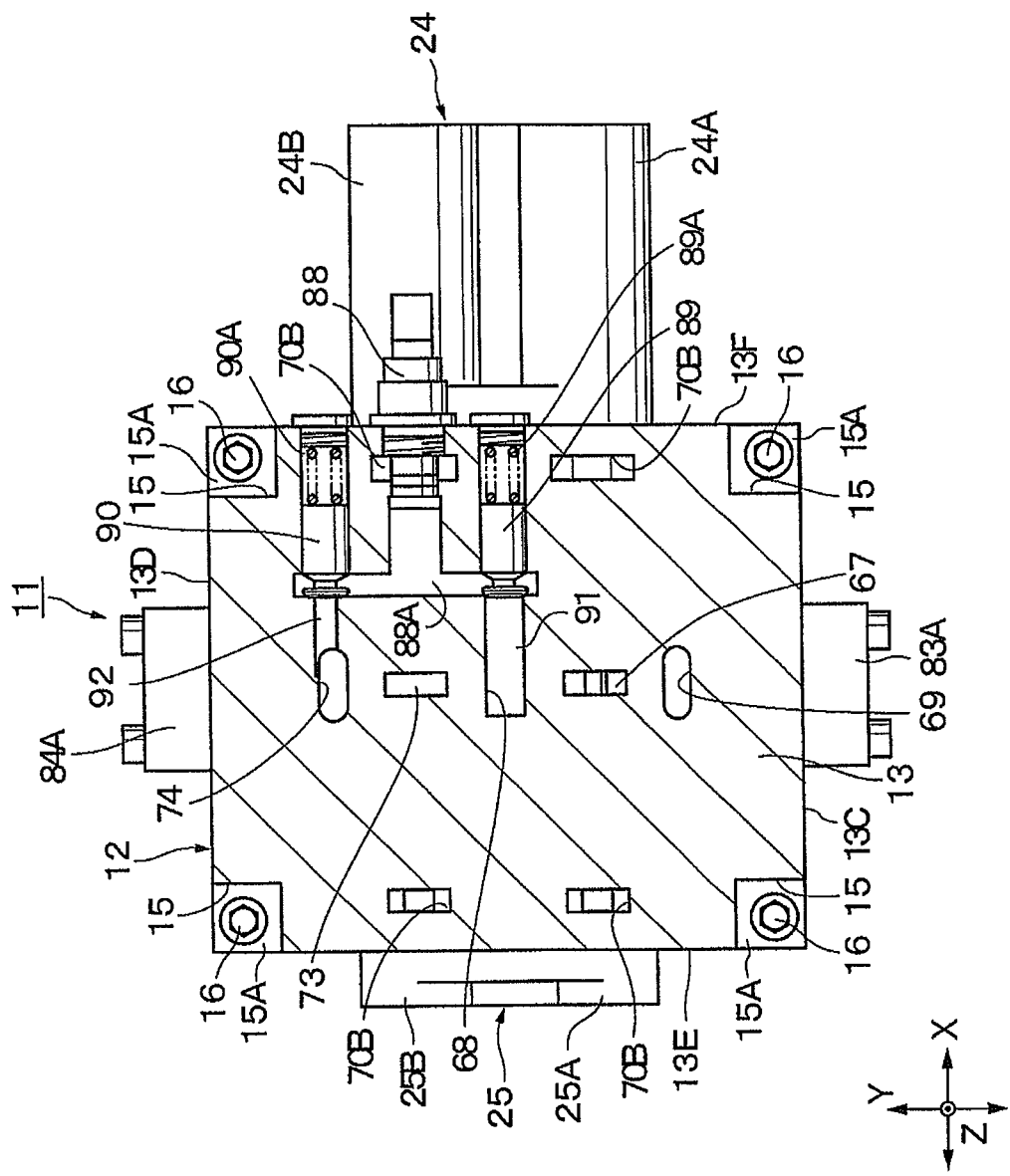
FIG. 9 is a cross sectional view of the first housing block together with a relief valve when seen from an arrow IX-IX direction in FIG. 5.

Indicated at 88 is a main relief valve provided on the first housing block 13. This relief valve 88 is to keep the maximum pressure of the pressurized oil delivered from the first hydraulic pump 77 and the second hydraulic pump 79 to a predetermined set pressure or less. As shown in FIGS. 9 and 14, the relief valve 88 is mounted on the first housing block 13, located between a pair of check valves 89 and 90. As shown in FIG. 9, the check valve 89 is urged by a valve spring 89A in a valve closing direction all the time so as to close a relief passage 91 communicating with the relief high-pressure passage 68. When the pressure in the relief passage 91 (that is, the relief high-pressure passage 68) exceeds the set pressure of the valve spring 89A, the check valve 89 is opened. At this time, the pressure in the relief high-pressure passage 68 is led into a pressure chamber 88A of the relief valve 88 through the relief passage 91. However, the check valve 89 prevents the hydraulic oil from flowing from the pressure chamber 88A toward the relief passage 91 side.

On the other hand, the relief valve 90 is urged by a valve spring 90A in a valve closing direction all the time so as to close a relief passage 92 communicating with the second high-pressure passage 74. When the pressure in the relief passage 92 (that is, the second high-pressure passage 74) exceeds the set pressure of the valve spring 90A, the check valve 90 is opened. At this time, the pressure in the second high-pressure passage 74 is led into the pressure chamber 88A of the relief valve 88 through the relief passage 92. However, the check valve 90 prevents the hydraulic oil from flowing from the pressure chamber 88A toward the relief passage 92 side.

The relief valve 88 opens when the pressure in the pressure chamber 88A (that is, the relief high-pressure passage 68 and the second high-pressure passage 74) exceeds the predetermined relief set pressure, and an excess pressure at this time is relieved to the tank 78 side through the side passage 70B of the low-pressure passage 70. As a result, the relief valve 88 keeps the maximum pressure in the first and second pump passages 66 and 72, the relief high-pressure passage 68, and the first and second high-pressure passages 69 and 74 (that is, the maximum pressure of the pressurized oil delivered from the first hydraulic pump 77 and the second hydraulic pump 79) to the predetermined relief set pressure or less.

As shown in FIG. 5, the relief valve 88 is disposed at a position closer to the joining surface 13B of the housing block 13 on a lower side of the spare control valve 38 (spool sliding bore 21). That is, the relief valve 88 is disposed at a position closer to the joining surface 13B than the spool sliding bores 18 to 21 provided in the housing block 13. As a result, as shown in FIG. 14, the relief valve 88 is arranged at a position substantially in the middle of the first pump port 65 and the second pump port 71 (that is, a position which can make the both pipeline lengths substantially equal).

The multiple valve device 11 mounted on the hydraulic excavator according to this embodiment has the configuration as described above, and its operation will be explained subsequently.

When the hydraulic excavator 1 (vehicle) is to travel, when an operator onboard in the cab 4 tilts and operates left-right traveling levers, the left-right traveling control valves 26 and 30 are switched from the neutral position (A) to either of the switching positions (B), (C) in accordance with the pilot pressure at this time.

Therefore, the right-side traveling control valve 26 supplies the pressurized oil from the hydraulic pump 77 to the right-side traveling motor 2R through the pressurized oil supply/discharge ports 29A and 29B. The left-side traveling control valve 30 supplies the pressurized oil from the hydraulic pump 79 to the left-side traveling motor 2L through the pressurized oil supply/discharge ports 33A and 33B. As a result, the lower traveling structure 2 drives the left-right crawler belt by traveling motors 2L and 2R and performs a traveling operation for moving the vehicle forward or backward.

when an excavating work of earth and sand is to be performed at a work site, while the boom 8 and the arm 9 of the working mechanism 7 are moved upward/downward, the bucket 10 is rotationally moved. That is, when the operator in the cab 4 tilts and operates the bucket operation lever, the bucket control valve 34 is switched from the neutral position (A) to either of the switching positions (B), (C). Thus, the pressurized oil from the hydraulic pump 77 is supplied to the bucket cylinder 10A through the bucket control valve 34 and the pressurized oil supply/discharge ports 37A and 37B.

When the boom operation lever is tilted, the boom control valves 47 and 48 are switched from the neutral position (A) to either of the switching positions (B), (C). Thus, the pressurized oil from the hydraulic pumps 77 and 79 is supplied to the boom cylinder 8A through the boom control valves 47 and 48 and the pressurized oil supply/discharge ports 53A and 53B. When the arm operation lever is tilted, the arm control valves 54 and 55 are switched from the neutral position (A) to either of the switching positions (B), (C). Thus, the pressurized oil from the hydraulic pumps 77 and 79 is supplied to the arm cylinder 9A through the arm control valves 54 and 55 and the pressurized oil supply/discharge ports 60A and 60B.

On the other hand, when the upper revolving structure 3 is revolved/driven on the lower traveling structure 2, the revolution control valve 61 is switched from the neutral position (A) to either of the switching positions (B), (C) in accordance with a tilting operation of the revolution operation lever. As a result, the pressurized oil from the hydraulic pump 79 is supplied to the revolution motor 3M through the revolution control valve 61 and the pressurized oil supply/discharge ports 64A and 64B.

Here, in this embodiment, the valve housing 12 of the multiple valve device 11 is formed by being split into two parts, that is, the first and second housing blocks 13 and 14. In this case, the first and second housing blocks 13 and 14 are configured to abut against and to be separated away from each other at the positions of joining surfaces 13B and 14A faced with each other. In the first housing block 13, each of the recessed parts 15 which becomes the seating surface portion 15A for fastening the bolt is formed using a space between itself and the joining surface 13B.

Therefore, when the first housing block 13 is fixed (connected) to the second housing block 14 in an abutting state, the bolt attaching space by each of the recessed parts 15 is used, and the plurality of relatively short bolts 16 can be fastened to the seating surface portion 15A. As a result, the first housing block 13 and the second housing block 14 can be fixed in the abutting state, and the valve housing 12 of the multiple valve device 11 can be assembled easily.

At this time, in the first housing block 13, the spool sliding bores 18 to 21, four in total can be arranged forming the three-dimensional structure extending in parallel with each other along the X-axis direction in a state separated away from each other in the Y-axis direction and in the Z-axis direction. As a result, on the first housing block 13 side, the left-right traveling control valves 26 and 30, the bucket control valve 34, and the spare control valve 38 can be assembled with a compact structure.

On the other hand, in the second housing block 14, the five spool sliding bores 42 to 46 in total can be arranged forming the three-dimensional structure of extending in parallel with each other along the X-axis direction in a state separated away from each other in the Y-axis direction and in the Z-axis direction. As a result, on the second housing block 14 side, the boom control valves 47 and 48, the arm control valves 54 and 55, and the revolution control valve 61 can be assembled with a compact structure.

Thus, if the number of spool sliding bores (spool valves) to be provided in the valve housing 12 is to be increased, it can be coped with by enlarging dimensions of the housing blocks 13 and 14 in the Z-axis direction perpendicular to the joining surfaces 13B and 14A. In this case, since there is no need to increase the dimensions of the housing blocks 13 and 14 in the Y-axis direction in parallel with the joining surfaces 13B and 14A, areas of the joining surfaces 13B and 14A can be made as small as possible.

Therefore, according to this embodiment, while the advantages of the two-split type valve housing 12 is utilized, the abutting area between the first and second housing blocks 13 and 14, that is, the areas of the joining surfaces 13B and 14A can be reduced. Moreover, the number of passages including the first and second high-pressure passages 69 and 74 and the first and second center bypass passages 67 and 73 passing between the joining surfaces 13B and 14A (that is, connection spots of the oil passages) can be reliably reduced as compared with the prior art.

As a result, occurrence of oil leakage and defective sealing in the joining surfaces 13B and 14A between the first and second housing blocks 13 and 14 can be suppressed, and sealing performance can be improved. Moreover, the number of the bolts 16 used for fastening the first and second housing blocks 13 and 14 in the abutting state can be reduced, and workability in assembling can be improved by reducing the number of components.

The spool sliding bores 18 to 21 and 42 to 46 can be arranged in a compact manner forming a three-dimensional structure in the first and second housing blocks 13 and 14. Thus, even as compared with the prior-art two-split type, reduction in size and weight of the entire valve housing 12 can be realized, and handling performances and workability in transport and conveyance can be improved.

A structure of a die or particularly of a core used when the first and second housing blocks 13 and 14 are cast, respectively, can be simplified, and works of removing chips inside or checking after the molding can be performed easily. Moreover, work time for the molding process in casting can be reduced, and workability and productivity can be improved.

Moreover, the first housing block 13 is configured such that the relief valve 88 is provided at a position closer to the joining surface 13B than the spool sliding bores 18 to 21, for example. Thus, the relief valve 88 can be arranged at a position substantially in the middle between the first and second hydraulic pumps 77 and 79 (that is, the position close to the joining surfaces 13B and 14A) in the plurality of first and second pump passages 66 and 72 and the first and second high-pressure passages 69 and 74 formed in the first and second housing blocks 13 and 14.

As a result, occurrence of fluctuation in the maximum pressure in the pipeline between the first pump passage 66 and the first high-pressure passage 69 connected to the first hydraulic pump 77 and the second pump passage 72 and the second high-pressure passage 74 connected to the second hydraulic pump 79 can be suppressed, and an adjusting work of a delivery pressure (maximum pressure) between the first and second hydraulic pumps 77 and 79 can be easily performed.

It should be noted that in the above-described embodiment, an instance in which the left-right traveling control valves 26 and 30, the bucket control valve 34, and the spare control valve 38 are provided on the first housing block 13, and the boom control valves 47 and 48, the arm control valves 54 and 55, and the revolution control valve 61 are provided on the second housing block 14 is explained as an example. However, the present invention is not limited to that and may be configured such that two boom control valves, two arm control valves and one revolution control valve are provided on the first housing block 13, a traveling left control valve, a traveling right control valve, a bucket control valve, and a spare control valve are provided on the second housing block 14, for example.

In this case, it may be configured such that, three spool sliding bores (three spool sliding bores in total, that is, a boom control valve, an arm control valve, and a revolution control valve, for example) are provided in the first housing block 13 as the minimum number, and three spool sliding bores (three spool sliding bores in total, that is, a traveling left control valve, a traveling right control valve, and a bucket control valve, for example) are provided in the second housing block 14 similarly as the minimum number. Specifically, it may be so configured that, in the valve housing on which 6 to 12 control valves (spool sliding bores) are provided, 3 to 6 control valves (spool sliding bores) are provided in the first housing block and 3 to 6 control valves (spool sliding bores) are provided in the second housing block.

These control valves (a plurality of control valves composed of 6 or more and 12 or less of spool sliding bores) can be provided in any of the first and second housing blocks. Namely, these relationship may be changed as appropriate depending on a hydraulic excavator (construction machine) on which the multiple valve device is mounted or a hydraulic work machine other than that. In this case, it may be so configured that, three or more and six or less spool sliding bores in total are provided on the first housing block so as to form a three-dimensional structure and three or more and six or less spool sliding bores in total are provided on the second housing block so as to form another three-dimensional structure.

Particularly, in order to have a configuration in which one relief valve is arranged at a position substantially in the middle of two hydraulic pumps (that is, a position close to the joining surface), the number of spool sliding bores to be provided in the first housing block and the number of spool sliding bores to be provided in the second housing block are preferably designed to be equal as much as possible. As a result, occurrence of fluctuation in the delivery pressure between the two hydraulic pumps can be favorably suppressed.

Moreover, a construction machine on which the multiple valve device of the present invention is to be mounted is not limited to the hydraulic excavator but the present invention can be applied to a wheel-type hydraulic excavator, a hydraulic crane, a wheel loader, a bulldozer or a work vehicle called a lift truck, for example, and also to hydraulic devices other than the construction machine.

DESCRIPTION OF REFERENCE NUMERALS

1: Hydraulic excavator (Construction machine)
2: Lower traveling structure
3: Upper revolving structure
7: Working mechanism
8: Boom
9: Arm
10: Bucket (Work tool)
11: Multiple valve device
12: Valve housing
13: First housing block
13B, 14A: Joining surface
14: Second housing block
18, 19, 20, 21: Spool sliding bore
18A, 18B, 19A, 19B, 20A, 20B, 21A, 21B: Oil groove on pressurized oil supply/discharge side (Oil passage on actuator side)
18C, 19C, 20C, 21C: Oil groove on high pressure side (Oil passage on hydraulic source side)
18D, 19D, 20D, 21D: Oil groove on low pressure side (Oil passage on hydraulic source side)
22, 23, 24, 25: Cover member
26, 30: Traveling control valve
27, 31, 35, 39: Spool
29A, 29B, 33A, 33B, 37A, 37B, 41A, 41B: Pressurized oil supply/discharge port (Oil passage on actuator side)
34: Bucket control valve (Work tool control valve)
38: Spare control valve
42, 43, 44, 45, 46: Spool sliding bore
42A, 42B, 43A, 43B, 44A, 44B, 45A, 45B, 46A, 46B: Oil groove on pressurized oil supply/discharge side (Oil passage on actuator side)
42C, 43C, 44C, 45C, 46C: Oil groove on high pressure side (Oil passage on hydraulic source side)
42D, 43D, 44D, 45D, 46D: Oil groove on low pressure side (Oil passage on hydraulic source side)
47, 48: Boom control valve
49, 51, 56, 58, 62: Spool
53A, 53B, 60A, 60B, 64A, 64B: Pressurized oil supply/discharge port (Oil passage on actuator side)
54, 55: Arm control valve
61: Revolution control valve
65: First pump port
67: First center bypass passage
68: Relief high-pressure passage (Oil passage on hydraulic source side)
69: First high-pressure passage (Oil passage on hydraulic source side)
70: Low-pressure passage (Oil passage on hydraulic source side)
71: Second pump port
73: Second center bypass passage
74: Second high-pressure passage (Oil passage on hydraulic source side)
75: Tank port
76: Tank passage (Oil passage on hydraulic source side)
77: First hydraulic pump (First hydraulic source)
78: Tank
79: Second hydraulic pump (Second hydraulic source)
80 to 87: Check valve
88: Relief valve

The invention claimed is:

1. A multiple valve device comprising:
a valve housing including six or more spool sliding bores, each spool sliding bore is in communication with a respective plurality of oil passages on a hydraulic source side and a respective plurality of oil passages on an actuator side; and
six or more spools moveably inserted in each respective said spool sliding bore of said valve housing, each spool allowing or shutting off communication with said respective plurality of oil passages on said hydraulic source side and said respective plurality of oil passages on said actuator side,
wherein said valve housing is split into two parts which are a first housing block and a second housing block abutting against each other at first and second joining surfaces of the first housing block and the second housing block, respectively,
wherein said three or more spool sliding bores of said six or more spool sliding bores are disposed in said first housing block and are configured to be disposed forming a three-dimensional structure in a direction parallel with and in a direction perpendicular to said first joining surface,
wherein said remaining three or more spool sliding bores of said six or more spool sliding bores are disposed in said second housing block and are configured to be disposed forming another three-dimensional structure in a direction parallel with and in a direction perpendicular to said second joining surface,
wherein a relief valve for suppressing a maximum pressure in each of said oil passages to a predetermined set pressure or less is disposed in one of said first and second housing blocks, and
wherein said relief valve is disposed at a position closer to said one of said first and second joining surfaces than each of said spool sliding bores disposed in said one of said first and second housing blocks.

2. The multiple valve device according to claim 1, wherein said valve housing constitutes a plurality of directional control valves used in a construction machine.

3. The multiple valve device according to claim 1, wherein
said first housing block constitutes left-right traveling directional control valves, a work tool directional control valve of a working mechanism, and a spare directional control valve; and
said second housing block constitutes a pair of boom directional control valves of said working mechanism, a pair of arm directional control valves, and a revolution directional control valve of an upper revolving structure.

4. The multiple valve device according to claim 1, wherein
a first pump port for connecting a first hydraulic pump is provided in said first housing block at a position close to a surface on a side opposite to said first joining surface;
a second pump port for connecting a second hydraulic pump is provided in said second housing block at a position close to a surface on a side opposite to said second joining surface; and
said relief valve is configured to suppress a maximum pressure of pressurized oil delivered from said first hydraulic pump and second hydraulic pump to said set pressure or less.

* * * * *